United States Patent
Resconi et al.

(10) Patent No.: US 12,319,772 B2
(45) Date of Patent: *Jun. 3, 2025

(54) CATALYSTS

(71) Applicant: BOREALIS AG, Vienna (AT)

(72) Inventors: Luigi Maria Cristoforo Resconi, Linz (AT); Simon Schwarzenberger, Linz (AT); Ville Virkkunen, Porvoo (FI); Alexander Reznichenko, Helsinki (FI); Vyatcheslav V. Izmer, Moscow (RU); Dmitry S. Kononovich, Moscow (RU); Alexander Z. Voskoboynikov, Moscow (RU)

(73) Assignee: BOREALIS AG, Vienna (AT)

( * ) Notice: Subject to any disclaimer, the term of this patent is extended or adjusted under 35 U.S.C. 154(b) by 497 days.

This patent is subject to a terminal disclaimer.

(21) Appl. No.: 17/763,283

(22) PCT Filed: Sep. 25, 2020

(86) PCT No.: PCT/EP2020/076897
§ 371 (c)(1),
(2) Date: Mar. 24, 2022

(87) PCT Pub. No.: WO2021/058740
PCT Pub. Date: Apr. 1, 2021

(65) Prior Publication Data
US 2022/0356274 A1     Nov. 10, 2022

(30) Foreign Application Priority Data

Sep. 25, 2019 (EP) ..................................... 19199696
Nov. 26, 2019 (EP) ..................................... 19211662

(51) Int. Cl.
*C07F 17/00* (2006.01)
*C08F 4/02* (2006.01)
(Continued)

(52) U.S. Cl.
CPC ............ *C08F 4/6498* (2013.01); *C07F 17/00* (2013.01); *C08F 4/02* (2013.01); *C08F 4/65927* (2013.01);
(Continued)

(58) Field of Classification Search
CPC .... C07F 17/00; C08F 4/65927; C08F 110/06; C08F 216/16; C08F 210/16
See application file for complete search history.

(56) References Cited

U.S. PATENT DOCUMENTS 5,780,660 A     7/1998 Lin et al.
6,262,286 B1    7/2001 Gregorius et al.
(Continued)

FOREIGN PATENT DOCUMENTS

EP     0768320 A1     4/1997
EP     0819695 B1     4/2003
(Continued)

OTHER PUBLICATIONS

International search report and written opinion mailed Feb. 1, 2021 in International Application No. PCTEP2020076897 (16 pages).
International search report and written opinion mailed Nov. 25, 2020 in International Application No. PCTEP2020076901 (10 pages).
Busico, et al., Polymerization in the Presence of a Monocyclopentadienyl Zirconium(IV) Acetamidinate Catalyst: Microstructural and Mechanistic Insights, Macromol. Rapid Commun. 2007, 28, 1128.
Cheng, H N., 13C NMR Analysis of Ethylene-Propylene Rubbers, Macromolecules 1984, 17, 1950.
Del Hierro, P et al., Soluble Fraction Analysis in polypropylene, The Column, Feb. 2014. pp. 18-23.
Grein, et al., Impact modified isotatic polypropylene with controlled rubber intrinsic viscosities: Some new aspects about morphology and fracture, J. Appl. Polym. Sci. 2003, 87, 1702-1712.
Grein, et al., Melt viscosity effects in ethylene-propylene copolymers, Rheol. Acta, 2007, 46, 1083-1089.
Machat, Martin et al., "Ultrarigid indenyl-based hafnocene complexes for the highly isoselective polymerization of propene: tunable polymerization performance adopting various sterically demanding 4-aryl substituents," Organometallics, 2016, 36(2), 399-408.
Premphet, et al., Polypropylene/metallocene ethylene-octene copolymer blends with a bimodal particle size distribution: Mechanical properties and their controlling factors, J. Appl. Polym. Sci. 2002, 85, 2412-2418.

(Continued)

*Primary Examiner* — Caixia Lu
(74) *Attorney, Agent, or Firm* — Meunier Carlin & Curfman LLC

(57) ABSTRACT

A metallocene complex of formula (I): each X is a sigma-ligand; in the group $R_2Si$— at least one R is methyl or ethyl, and the other R is selected from methyl, ethyl, n-propyl, isopropyl, n-butyl or isobutyl, pentyl, hexyl, cyclohexyl and phenyl; each $R^1$ independently is the same or can be different and are a $CH_2$—$R^7$ group, with $R^7$ being H or linear or branched $C_{1-6}$-alkyl group, $C_{3-8}$ cycloalkyl group, or $C_{6-10}$ aryl group; each $R^2$ is independently a —CH=, —CY=, —$CH_2$—, —CHY— or —$CY_2$— group, wherein Y is a $C_{1-6}$ hydrocarbyl group and where n is 2-6; each $R^3$ and $R^4$ are independently the same or can be different and are hydrogen, a linear or branched $C_{1-6}$-alkyl group, a $C_{7-20}$ arylalkyl, $C_{7-20}$ alkylaryl group, $C_{6-20}$ aryl group, or an —OY group, wherein Y is a is a $C_{1-6}$ hydrocarbyl group; $R^5$ is a linear or branched $C_{1-6}$-alkyl group, $C_{7-20}$ arylalkyl, $C_{7-20}$ alkylaryl group or $C_{6-20}$-aryl group; and $R^6$ is a $C(R^8)_3$ group, with $R^8$ being a linear or branched $C_{1-6}$ alkyl group; (A) wherein at least one $R^3$ per phenyl group and at least one $R^4$ is not hydrogen, and wherein at least one $R^3$ per phenyl group and at least one $R^4$ is hydrogen; or (B) wherein one $R^3$ is an —OY group, wherein Y is a is a $C_{1-6}$ hydrocarbyl group, in 4 position of each phenyl group and the two other $R^3$ groups are tert-butyl groups; and/or (C) wherein one $R^4$ is an —OY group, wherein Y is a is a $C_{1-6}$ hydrocarbyl group, in 4-position of the phenyl ring and the two other $R^4$ groups are tert-butyl groups.

(Continued)

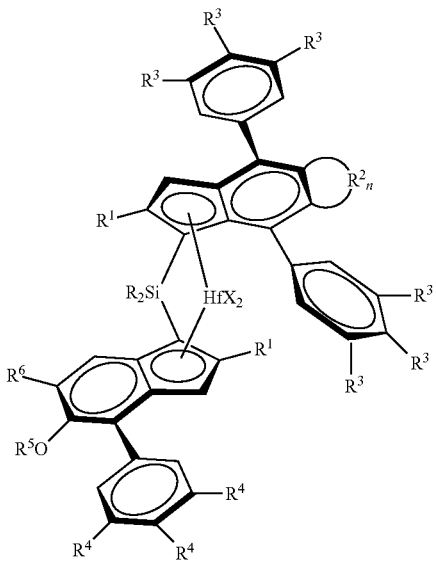

Formula (I)

13 Claims, No Drawings

(51) Int. Cl.
*C08F 4/649* (2006.01)
*C08F 4/6592* (2006.01)
*C08F 10/06* (2006.01)
*C08F 110/06* (2006.01)
*C08F 210/06* (2006.01)
*C08F 210/16* (2006.01)
*C08L 23/14* (2006.01)

(52) U.S. Cl.
CPC ............ *C08F 10/06* (2013.01); *C08F 210/06* (2013.01); *C08L 23/142* (2013.01); *C08F 2420/07* (2021.01); *C08F 2420/10* (2021.01); *C08F 2800/20* (2013.01); *C08L 2205/025* (2013.01)

(56) References Cited

U.S. PATENT DOCUMENTS

| | | |
|---|---|---|
| 7,098,354 B2 | 8/2006 | Damrau et al. |
| 7,341,971 B2 | 3/2008 | Denifl et al. |
| 7,465,688 B2 | 12/2008 | Guidotti et al. |
| 7,671,223 B2 | 3/2010 | Garcia et al. |
| 7,842,801 B2 | 11/2010 | Baettig et al. |
| 8,933,256 B2 | 1/2015 | Castro et al. |
| 8,946,363 B2 | 2/2015 | Resconi et al. |
| 9,029,284 B2 | 5/2015 | Resconi et al. |
| 9,079,985 B2 | 7/2015 | Resconi et al. |
| 9,469,700 B2 | 10/2016 | Kallio et al. |
| 9,475,890 B2 | 10/2016 | Kallio et al. |
| 9,540,465 B2 | 1/2017 | Greco et al. |
| 10,035,866 B2 | 7/2018 | Denifl et al. |
| 10,167,355 B2 | 1/2019 | Ajellal et al. |
| 10,875,993 B2 | 12/2020 | Gahleitner et al. |
| 10,982,019 B2 | 4/2021 | Saeed et al. |
| 11,078,304 B2 | 8/2021 | Resconi et al. |
| 11,192,963 B2 | 12/2021 | Fait et al. |
| 11,542,346 B2 * | 1/2023 | Izmer ............ C07F 17/02 |
| 2001/0044505 A1 | 11/2001 | Ford et al. |
| 2003/0203809 A1 | 10/2003 | Kao et al. |
| 2004/0254310 A1 | 12/2004 | Winslow et al. |
| 2006/0116490 A1 | 6/2006 | Paczkowski et al. |
| 2018/0155459 A1 | 6/2018 | Li et al. |
| 2019/0308995 A1 | 10/2019 | Ajellal et al. |
| 2020/0079884 A1 | 3/2020 | Ajellal et al. |
| 2020/0190229 A1 | 6/2020 | Denifl et al. |
| 2021/0002390 A1 | 1/2021 | Sumerin et al. |
| 2021/0002397 A1 | 1/2021 | Hoff et al. |
| 2021/0017307 A1 | 1/2021 | Izmer et al. |
| 2021/0079128 A1 | 3/2021 | Reznichenko et al. |
| 2021/0095057 A1 | 4/2021 | Resconi et al. |
| 2021/0179744 A1 | 6/2021 | Reznichenko et al. |
| 2021/0292355 A1 | 9/2021 | Ajellal et al. |

FOREIGN PATENT DOCUMENTS

| | | |
|---|---|---|
| EP | 2072546 B1 | 2/2010 |
| EP | 2368937 A1 | 9/2011 |
| EP | 2933277 A1 | 10/2015 |
| EP | 2729529 B1 | 4/2016 |
| EP | 2824142 B1 | 4/2016 |
| EP | 2829558 B1 | 12/2016 |
| EP | 2545084 B1 | 8/2017 |
| EP | 3201268 B1 | 12/2018 |
| KR | 20170073463 A | 6/2017 |
| WO | 9414856 A1 | 7/1994 |
| WO | 9512622 A1 | 5/1995 |
| WO | 0202576 A1 | 1/2002 |
| WO | 2006097497 A1 | 9/2006 |
| WO | 2006100258 A1 | 9/2006 |
| WO | 2007116034 A1 | 10/2007 |
| WO | 2011160946 A1 | 12/2011 |
| WO | 2014096171 A1 | 6/2014 |
| WO | 2016038210 A1 | 3/2016 |
| WO | 2016038211 A1 | 3/2016 |
| WO | 2018122134 A1 | 7/2018 |
| WO | 2019179959 A1 | 9/2019 |
| WO | 2020002654 A1 | 1/2020 |
| WO | 2020011825 A1 | 1/2020 |
| WO | 2020208128 A1 | 10/2020 |
| WO | 2020239598 A1 | 12/2020 |
| WO | 2020239602 A1 | 12/2020 |
| WO | 2020239603 A1 | 12/2020 |

OTHER PUBLICATIONS

Resconi, L et al., Selectivity in Propene Polymerization with Metallocene Catalyts, Chem. Rev. 2000, 100 (4), 1253.

Wang, W J. et al., Structural analysis of ethylene/propylene copolymers synthesized with a constrained geometry catalyst, Macromolecules, 2000, 33, 1157.

Zhou, Z et al., A new decoupling method for accurate quantification of polyethylene copolymer composition and triad sequence distribution with 13C NMR, J. Mag. Reson. 187 (2007) 225.

* cited by examiner dolaɾɾ
CATALYSTS

CROSS REFERENCE TO RELATED APPLICATIONS

This application is a United States National Phase Patent Application of International Patent Application Number PCT/EP2020/076897, filed on Sep. 25, 2020, which claims the benefit of priority to EP Application Serial No. 19199696.6, filed Sep. 25, 2019, and EP Application No. 19211662.2, filed Nov. 26, 2019, all of which are incorporated by reference herein in their entireties.

CATALYSTS

This invention relates to new bisindenyl ligands, complexes thereof and catalysts comprising those complexes. The invention also relates to the use of the new bisindenyl metallocene catalysts for the production of heterophasic polypropylene copolymers, especially with an ethylene propylene rubber component with high molecular weight, and with a matrix component of high melting point. The invention still further relates to a synthesis method for producing metallocene complexes with improved isolated yield of the desired anti-isomer of $C_1$-symmetric metallocenes.

BACKGROUND

Metallocene catalysts have been used to manufacture polyolefins for many years. Countless academic and patent publications describe the use of these catalysts in olefin polymerization. Metallocenes are now used industrially and polyethylenes and polypropylenes in particular are often produced using cyclopentadienyl based catalyst systems with different substitution patterns.

These metallocenes are often used to prepare polypropylenes such as isotactic polypropylene. Metallocenes, whose structure has been optimized to produce high molecular weight isotactic polypropylene, often show limitations in their molecular weight capability when used to produce heterophasic polypropylene with an ethylene-propylene copolymer in the gas phase. It is known that tensile and impact properties of a heterophasic polypropylene, for a given rubber comonomer composition, can be improved by increasing the molecular weight of the rubber phase (as described for example in J. Appl. Polym. Sci. 2002, vol. 85, pp. 2412-2418 and in J. Appl. Polym. Sci. 2003, vol. 87, pp. 1702-1712).

Typically however, the ethylene-propylene rubber molecular weight (measured as intrinsic viscosity, $IV_{EPR}$) is less than 4 dL/g, measured in decahydronaphthalene (decalin) at 135° C.

In addition, metallocene catalysts which might be used for the preparation of heterophasic polypropylene tend to produce a homopolymer matrix (and hence a heterophasic polypropylene polymer as a whole) with relatively low melting point (Tm), usually below 155-157° C. It is known that a higher Tm is beneficial for the material stiffness. The combination of a high melting point of the homopolymer matrix (or a high melting point of the heterophasic polypropylene itself) and high molecular weight in the EPR rubber component is especially desirable.

In this regard, a heterophasic polypropylene is one that comprises a propylene homopolymer matrix (or a propylene copolymer matrix with a low comonomer content, i.e. a random propylene copolymer) and a propylene ethylene (or propylene-ethylene-1-butene) rubber component which is typically dispersed within the matrix.

The present inventors have developed a new catalyst which enables the formation of heterophasic polypropylene polymers with a high matrix melting point and high molecular weight in the EPR component. The metallocenes complexes of the invention are asymmetric hafnium bridged bisindenyl type structures. The prior art discloses some metallocenes that have some similarities to those invented.

$C_2$-symmetric metallocenes are disclosed in WO2007/116034. This document reports the synthesis and characterisation of, inter alia, the metallocene rac-Me$_2$Si(2-Me-4-Ph-5-OMe-6-tBuInd)$_2$ZrCl$_2$ and the use of it as a polymerization catalyst after activation with MAO for the homopolymerization of propylene and copolymerization of propylene with ethylene and higher alpha-olefins in solution polymerization. The IV of the produced polymers is around 3 to 3.4 dL/g, measured in tetrahydronaphthalene (THN) at 135° C. IV values measured in decalin are around 20% higher than those measured in THN.

WO2006/097497 describes, inter alia, rac-Me$_2$Si(2-Me-4-Ph-1,5,6,7-tetrahydro-s-indacen-1-yl)$_2$ZrCl$_2$ supported on silica and its use in the homo- and copolymerization of propylene with ethylene. The IV of the produced polymers is around 3 to 3.4 dL/g, measured in THN at 135° C.

WO2006/100258 describes the use of pseudo rac Dimethylsilanediyl-(6-methyl-4-(4'-tert-butylphenyl)-1,2,3,5-tetrahydro-s-indacen-7-yl)(2-isopropyl-4-(4'-tert-butylphenyl)-1-indenyl)-zirconium dichloride to make heterophasic polypropylene but again, low IVs are reported.

EP2072546 describes the synthesis of heterophasic polypropylene using a support-free asymmetric metallocene dimethylsilyl [(2-methyl-(4'-tert-butyl)-4-phenyl-indenyl) (2-isopropyl-(4'-tert-butyl)-4-phenyl-indenyl)]zirconium dichloride. The highest IV of the EPRs is reported as 3.4 dL/g, measured in decalin at 135° C.

EP2072584 describes the synthesis of heterophasic polypropylene using a support-free asymmetric metallocene dimethylsilyl [(2-methyl-(4'-tert-butyl)-4-phenyl-indenyl) (2-isopropyl-(4'-tert-butyl)-4-phenyl-indenyl)]zirconium dichloride. The highest IV of the EPRs is reported as 2 dL/g, measured in decalin at 135° C.

A number of known metallocene catalyst complexes are set out in the table below:

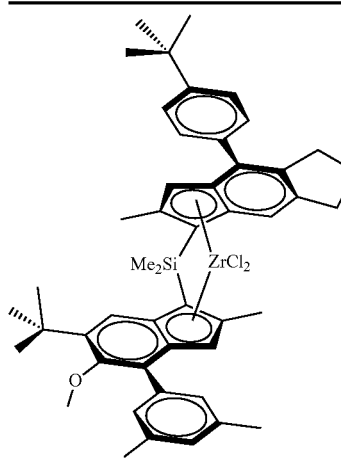

| Anti-dimethylsilanediyl[2-methyl-4-(3,5-dimethylphenyl)-5-methoxy-6-tert-butylinden-1-yl][2-methyl-4-(4-tert-butylphenyl)-1,5,6,7-tetrahydro-s-indacen-1-yl]zirconium dichloride WO2018122134 | Anti-dimethylsilanediyl[2-methyl-4-(3,5-dimethylphenyl)-5-methoxy-6-tert-butylinden-1-yl][2-methyl-4-(3,5-dimethylphenyl)-1,5,6,7-tetrahydro-s-indacen-1-yl]zirconium dichloride WO2018122134 | Anti-dimethylsilanediyl[2-methyl-4-(3,5-di-tert-butylphenyl)-5-methoxy-6-tert-butyl-inden-1-yl][2-methyl-4-(3,5-dimethylphenyl)-5,6,7-trihydro-s-indacen-1-yl]zirconium dichloride WO2018122134 |

The metallocene structures above are shown to offer $IV_{EPR}$ values of 3.4 dL/g, measured in decalin at 135° C.

WO2016/038210 and WO2016/038211 also describe heterophasic polypropylene polymerisation using the likes of rac-Dimethylsilylene-bis(6-tert-butyl-2-isobutyl-5-methoxy-4-phenyl-1H-inden-1-yl) zirconium dichloride. Again $IV_{EPR}$ values are low, such as 3.0 dL/g or less.

In EP2829558, the use of a borate co-activator in unsupported single Site catalyst reveals that the borate co-activator has a detrimental effect on the molecular weight of the rubber.

The present inventors sought higher IV in the EPR phase of heterophasic PP. The most important variable determining the molecular weight of the rubber ($Mw_{,EPR}$) is the metallocene ligand structure (defining the intrinsic molecular weight capability of the catalyst). Other factors can however encourage high IV values. Other factors include:
1. The polymerisation reactor internal temperature $T_P$ (the higher $T_P$, the lower is $Mw_{,EPR}$)
2. The partial pressure (concentration) of the comonomers in the gas phase reactor (the higher the monomer concentration, the higher is $Mw_{,EPR}$)
3. The gas phase comonomer ratio (that is, the C2/C3 ratio in the gas phase reactor that determines the rubber composition)
4. The amount of hydrogen carried over from the bulk (loop) reactor or intentionally added to the subsequent reactor
5. The type of activator (e.g. methylalumoxane, borate or their combination)

Variables 1-4 are process variables but variable 5 and the nature of the catalyst composition can be selected a priori.

We have surprisingly found that the use of the metallocene complexes of the invention enables the preparation of heterophasic polypropylene copolymers in which the EPR component has a higher molecular weight (higher $IV_{EPR}$) than previously observed. The resulting heterophasic polypropylene copolymers have excellent tensile and impact properties.

Concerning the metallocene synthesis methods, there are different approaches to racemo-selective (anti-racemo-selective in case of the bis-indenyl $C_1$-symmetric complexes) synthesis of group 4 metallocenes.

The first involves the modification of the transition metal salt used in the metallation step. While improving the final yield of the desired metallocene isomer, this procedure adds several more steps to the already complex synthesis protocol. Examples of this approach are described for example in WO1999/015538, WO2004/037840, U.S. Pat. No. 7,098,354 and in WO2005/108408.

A second approach is the decomposition of the unwanted isomer. While facilitating the isolation of the desired isomer, due to a non-fully selective decomposition, this method actually decreases the overall yield compared to the standard synthesis method. There are several documents describing this approach, for example in EP819695.

A third approach uses $R_4NBr$ as epimerisation agent. The use of $R_4NBr$ is, for example, disclosed in U.S. Pat. No. 7,465,688 in the context of specific metallocenes and solvents which are tuned to increase the yield of the desired isomer of these specific metallocenes. Yet, the temperatures that are applied are rather high.

A fourth approach, which is described in WO1998/020014, uses THF as epimerisation medium and maintains a slurry of bridged zirconocenes and THF at a temperature in a range of 20 to 120° C. for a time period of 1 to 12 hours. However, the desired anti-isomer cannot be obtained in a very high yield by this procedure.

The invention further relates to a new process for maximising the content of the desired anti-isomer, especially a desired racemic anti-isomer, more especially a desired racemic anti-isomer in a $C_1$-symmetric metallocene complex.

SUMMARY OF INVENTION

Viewed from one aspect the invention provides a metallocene complex of formula (I):

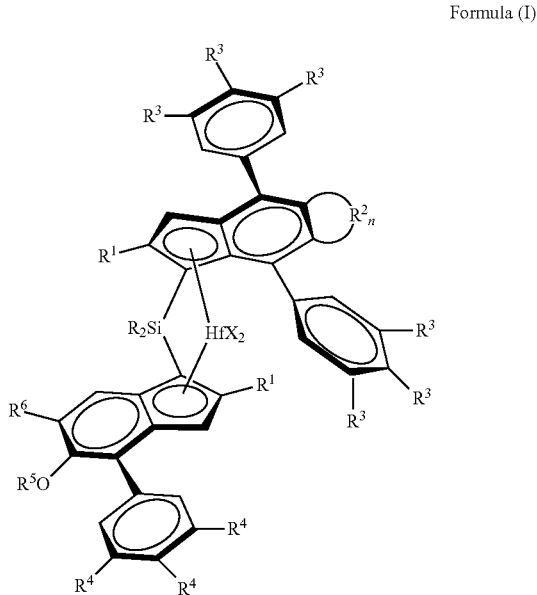

Formula (I)

each X is a sigma-ligand;

in the group $R_2Si$— at least one R is methyl or ethyl, and the other R is selected from methyl, ethyl, n-propyl, isopropyl, n-butyl or isobutyl, pentyl, hexyl, cyclohexyl and phenyl;

each $R^1$ independently is the same or can be different and are a $CH_2$—$R^7$ group, with $R^7$ being H or linear or branched $C_{1-6}$-alkyl group, $C_{3-8}$ cycloalkyl group, or $C_{6-10}$ aryl group;

each $R^2$ is independently a —CH=, —CY=, —$CH_2$—, —CHY— or —$CY_2$— group, wherein Y is a $C_{1-6}$ hydrocarbyl group and where n is 2-6;

each $R^3$ and $R^4$ are independently the same or can be different and are hydrogen, a linear or branched $C_{1-6}$-alkyl group, a $C_{7-20}$ arylalkyl, $C_{7-20}$ alkylaryl group, $C_{6-20}$ aryl group, or an —OY group, wherein Y is a is a $C_{1-6}$ hydrocarbyl group;

$R^5$ is a linear or branched $C_{1-6}$-alkyl group, $C_{7-20}$ arylalkyl, $C_{7-20}$ alkylaryl group or $C_{6-20}$-aryl group; and $R^6$ is a $C(R^8)_3$ group, with $R^8$ being a linear or branched $C_{1-6}$ alkyl group;

(A) wherein at least one $R^3$ per phenyl group and at least one $R^4$ is not hydrogen, and wherein at least one $R^3$ per phenyl group and at least one $R^4$ is hydrogen; or (B) wherein one $R^3$ is an —OY group, wherein Y is a is a $C_{1-6}$ hydrocarbyl group, in 4 position of each phenyl group and the two other $R^3$ groups are tert-butyl groups; and/or (C) wherein one $R^4$ is an —OY group, wherein Y is a is a $C_{1-6}$ hydrocarbyl group, in 4-position of the phenyl ring and the two other $R^4$ groups are tert-butyl groups.

Viewed from a further aspect the invention provides a catalyst comprising
(i) a metallocene complex of formula (I) as hereinbefore defined; and
(ii) a cocatalyst comprising a compound of group 13 element.

The catalyst of the invention can be used in non-supported form or in solid form. The catalyst of the invention may be used as a homogeneous catalyst or heterogeneous catalyst. The catalyst of the invention in solid form, preferably in solid particulate form, can be either supported on an external carrier material, like silica or alumina or a mixed oxide such as silica-alumina or, in one embodiment, is free from an external carrier, however still being in solid form, as described in WO2003/051934.

Thus, viewed from a further aspect the invention provides a catalyst comprising
(i) a metallocene complex of formula (I) as hereinbefore defined;
(ii) a cocatalyst comprising a compound of group 13 element; and
(iii) a silica support.

Viewed from another aspect the invention provides the use in propylene polymerization, especially in the production of a heterophasic polypropylene copolymer of a catalyst as hereinbefore defined.

Viewed from another aspect the invention provides a process for the polymerization of propylene comprising reacting propylene and optional comonomers, especially ethylene and/or 1-butene, with a catalyst as hereinbefore described.

More specifically, the invention comprises a process for the preparation of a heterophasic propylene ethylene copolymer or heterophasic propylene ethylene 1-butene copolymer comprising:

(I) polymerising propylene and optionally ethylene and/or 1-butene in the presence of the catalyst according to the invention so as to form:
a1) a crystalline fraction (CF) comprising a propylene homopolymer or propylene copolymer with ethylene and/or with 1-butene having up to 2 wt % comonomer as said matrix component; and
(II) subsequently polymerising additional propylene and ethylene and optionally 1-butene, preferably in the gas phase, in the presence of the matrix component of step (I) so as to form:
a2) a propylene ethylene copolymer or propylene-ethylene-1-butene copolymer soluble fraction (SF) having a comonomer content of 12 to 85 wt %, preferably 15.0 to 70.0 wt %;
wherein the crystalline fraction (CF) constitutes 30.0 to 95.0 wt % and the soluble fraction (SF) constitutes 5.0 to 70.0 wt % of the heterophasic propylene ethylene copolymer or heterophasic propylene ethylene 1-butene copolymer,
wherein the amount of crystalline fraction (CF) and the amount of soluble fraction (SF) are determined in 1,2,4-trichlorobenzene at 40° C.; and wherein
the soluble fraction (SF) of the heterophasic propylene-ethylene copolymer or heterophasic propylene-ethylene-1-butene copolymer has an intrinsic viscosity IV(SF) in decalin at 135° C. of 1.5 to 10 dl/g, preferably 2 to 9 dl/g, more preferably 4.5 to 9.0 dl/g, most preferably 5.5 to 8.0 dl/g.

Preferably the comonomer is ethylene only.

The invention still further relates to a synthesis method for producing metallocene complexes with improved isolated yield of the desired anti-isomer, in particular $C_1$-symmetric metallocene complexes.

DEFINITIONS

Throughout the description, the following definitions are employed:

The term "$C_{1-20}$ hydrocarbyl group" includes $C_{1-20}$ alkyl, $C_{2-20}$ alkenyl, $C_{2-20}$ alkynyl, $C_{3-20}$ cycloalkyl, $C_{3-20}$ cycloalkenyl, $C_{6-20}$ aryl groups, $C_{7-20}$ alkylaryl groups or $C_{7-20}$ arylalkyl groups or of course mixtures of these groups such as cycloalkyl substituted by alkyl. Linear and branched hydrocarbyl groups cannot contain cyclic units. Aliphatic hydrocarbyl groups cannot contain aryl rings.

Unless otherwise stated, preferred $C_{1-20}$ hydrocarbyl groups are $C_{1-20}$ alkyl, $C_{4-20}$ cycloalkyl, $C_{5-20}$ cycloalkylalkyl groups, $C_{7-20}$ alkylaryl groups, $C_{7-20}$ arylalkyl groups or $C_{6-20}$ aryl groups, especially $C_{1-10}$ alkyl groups, $C_{6-10}$ aryl groups, or $C_{7-12}$ arylalkyl groups, e.g. $C_{1-8}$ alkyl groups. Most especially preferred hydrocarbyl groups are methyl, ethyl, propyl, isopropyl, tert-butyl, isobutyl, $C_{5-6}$-cycloalkyl, cyclohexylmethyl, phenyl or benzyl.

The term "halo" includes fluoro, chloro, bromo and iodo groups, especially chloro or fluoro groups, when relating to the complex definition.

The oxidation state of the metal ion is governed primarily by the nature of the metal ion in question and the stability of the individual oxidation states of each metal ion.

It is appreciated that in the complexes of the invention, the metal ion is coordinated by ligands X to satisfy the valency of the metal ion and to fill its available coordination sites. The nature of these sigma-ligands can vary greatly.

The numbering of these rings will be evident from the structures indicated herein.

Catalyst activity is defined in this application to be the amount of polymer produced/g catalyst/h. Catalyst metal activity is defined here to be the amount of polymer produced/g Metal/h. The term productivity is also sometimes used to indicate the catalyst activity although herein it designates the amount of polymer produced per unit weight of catalyst. The term "molecular weight" is used herein to refer to weight average molecular weight Mw unless otherwise stated.

The amount of crystalline fraction (CF) and the amount of soluble fraction (SF) are determined in 1,2,4-trichlorobenzene at 40° C. The crystalline fraction is that part of the heterophasic propylene ethylene or 1-butene copolymer that does not dissolve in the solvent. The soluble fraction is correspondingly that portion that dissolves.

DETAILED DESCRIPTION OF INVENTION

This invention relates to a series of metallocene complexes and hence catalysts that are ideal for the production of heterophasic polypropylene in which the rubber phase (or the soluble fraction) has a high molecular weight, indicated by a high intrinsic viscosity. The matrix phase (or crystalline fraction) and hence the heterophasic polypropylene itself may have a high melting point. The metallocene complexes of the invention are asymmetrical. Asymmetrical means simply that the two π-ligands forming the metallocene are different.

The metallocene complexes of the invention are preferably chiral, racemic bridged bisindenyl $C_1$-symmetric metallocenes in their anti-configuration. Although the complexes of the invention are formally $C_1$-symmetric, the complexes ideally retain a pseudo-$C_2$-symmetry since they maintain $C_2$-symmetry in close proximity of the metal center although not at the ligand periphery. By nature of their chemistry both anti and syn enantiomer pairs (in case of $C_1$-symmetric complexes) are formed during the synthesis of the complexes. For the purpose of this invention, racemic-anti means that the two indenyl ligands are oriented in opposite directions with respect to the cyclopentadienyl-metal-cyclopentadienyl plane, while racemic-syn means that the two indenyl ligands are oriented in the same direction with respect to the cyclopentadienyl-metal-cyclopentadienyl plane, as shown in the scheme below.

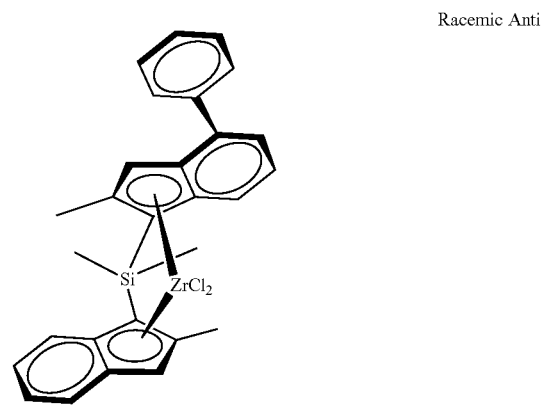

Racemic Anti

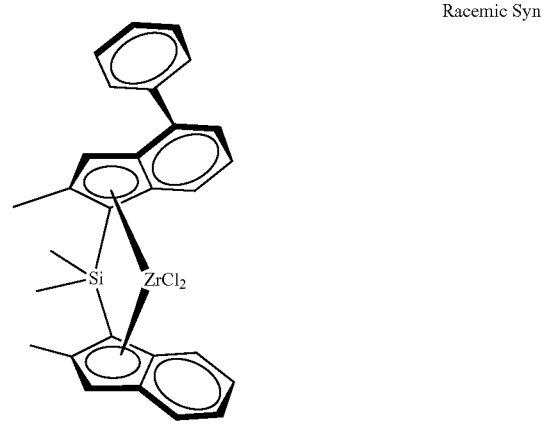

Racemic Syn

Formula (I), formula 5, formula 1a and any sub formulae, are intended to cover both syn- and anti-configurations. Preferred metallocene catalyst complexes are in the anti-configuration.

The metallocene complexes of the invention are preferably employed as the racemic-anti-isomers. Ideally, therefore at least 95% mol, such as at least 98% mol, especially at least 99% mol of the metallocene catalyst complex is in the racemic anti-isomeric form.

Metallocene Complexes

Metallocene complexes according to the invention are of formula (I):

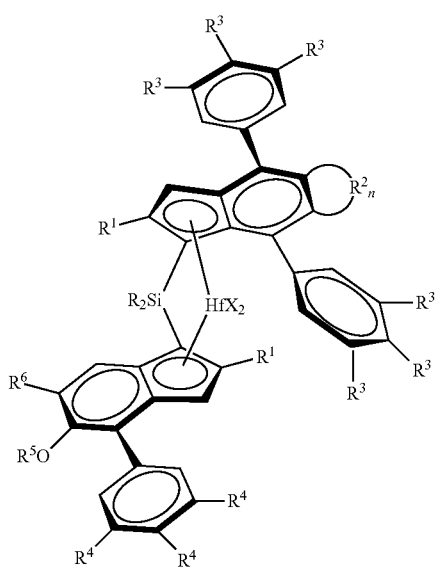

Formula (I)

In a complex of formula (I) each X is a sigma-ligand. Most preferably, each X is independently a hydrogen atom, a halogen atom, $C_{1-6}$ alkoxy group or an R' group, where R' is a $C_{1-6}$ alkyl, phenyl or benzyl group. Most preferably, X is chlorine, benzyl or a methyl group. Preferably, both X groups are the same. The most preferred options are two chlorides, two methyl or two benzyl groups, especially two chlorides.

In the bridging group $R_2Si$— at least one R is methyl or ethyl, and the other R is selected from methyl, ethyl, n-propyl, isopropyl, n-butyl or isobutyl, pentyl, hexyl, cyclohexyl and phenyl.

In a preferred formula $R_2Si$— represents $Me_2Si$—, $Et_2Si$— or (cyclohexyl)Me-Si—. Most preferably the bridge is —$Si(CH_3)_2$ or $Et_2Si$—.

Each $R^1$ independently is the same or can be different and are a $CH_2$—$R^7$ group, with $R^7$ being H or linear or branched $C_{1-6}$-alkyl group, like methyl, ethyl, n-propyl, i-propyl, n-butyl, i-butyl, sec-butyl and tert-butyl, $C_{3-8}$ cycloalkyl group (e.g. cyclohexyl), or $C_{6-10}$ aryl group (preferably phenyl).

Preferably, both $R^1$ groups are the same and are a $CH_2$—$R^7$ group, with $R^7$ being H or linear or branched $C_{1-4}$-alkyl group, more preferably, both $R^1$ groups are the same and are a $CH_2$—$R^7$ group, with $R^7$ being H or linear or branched $C_{1-3}$-alkyl group. Most preferably, both $R^1$ groups are methyl.

Each $R^2$ is independently a —CH=, —CY=, —$CH_2$—, —CHY— or —$CY_2$— group, wherein Y is a $C_{1-10}$ hydrocarbyl group, preferably a $C_{1-4}$ hydrocarbyl group and where n is 2-6, preferably 3-4. Ideally $R^2$ together with the atoms of the phenyl ring forms a five membered ring. It is preferred if $R^2$ is —$CH_2$— and n is 3.

Each substituent $R^3$ and $R^4$ are independently the same or can be different and are hydrogen, a linear or branched $C_{1-6}$-alkyl group, a $C_{7-20}$ arylalkyl, $C_{7-20}$ alkylaryl group, $C_{6-20}$ aryl group or an —OY group, wherein Y is a is a $C_{1-6}$ hydrocarbyl group. It is required that either:

(A) at least one $R^3$ per phenyl group and at least one $R^4$ is not hydrogen, and wherein at least one $R^3$ per phenyl group and at least one $R^4$ is hydrogen; or (B) one $R^3$ is an —OY group, wherein Y is a is a $C_{1-6}$ hydrocarbyl group in 4 position of each phenyl group and the two other $R^3$ groups are tert-butyl groups; and/or (C) one $R^4$ is an —OY group, wherein Y is a is a $C_{1-6}$ hydrocarbyl group in 4-position of the phenyl ring and the two other $R^4$ groups are tert-butyl groups.

The phenyl rings can therefore be mono, bis or trisubstituted.

More preferably, $R^3$ and $R^4$ are hydrogen or a linear or branched $C_{1-4}$ alkyl group or an —OY group, wherein Y is a $C_{1-4}$ hydrocarbyl group. Even more preferably, each $R^3$ and $R^4$ are independently hydrogen, methyl, ethyl, isopropyl, tert-butyl or methoxy, especially hydrogen, methyl or tert-butyl, wherein at least one $R^3$ per phenyl group and at least one $R^4$ is not hydrogen and wherein at least one $R^3$ per phenyl group and at least one $R^4$ is hydrogen; or at least one $R^3$ is a methoxy group in the 4-position of each phenyl group and the two other $R^3$ groups are tert-butyl groups; and/or at least one $R^4$ is a methoxy group in the 4-position of the phenyl ring and the two other $R^4$ are tert-butyl groups.

Thus, in one embodiment, one or two $R^3$ per phenyl group are not hydrogen and one or two $R^3$ groups are hydrogen.

If there are two non-hydrogen $R^3$ groups per phenyl group then the $R^3$ group representing hydrogen is preferably at the 4-position of the ring. If there are two $R^3$ groups representing hydrogen then the non-hydrogen $R^3$ group is preferably present at the 4-position of the ring.

Most preferably the two $R^3$ groups are the same. A preferred structure is 3',5'-di-methyl or 4'-tert-butyl for both phenyl groups substituted by $R^3$ groups. Alternatively, the structure is 3,5-di-tert-butyl-4-methoxyphenyl.

For the indenyl moiety, in one embodiment, one or two $R^4$ groups on the phenyl group are not hydrogen. More preferably two $R^4$ groups are not hydrogen. If there are two non-hydrogen $R^4$ groups then the $R^4$ representing hydrogen is preferably at the 4-position of the ring. If there are two $R^4$ groups representing hydrogen then the non-hydrogen $R^4$ group is preferably present at the 4-position of the ring.

Most preferably the two $R^4$ are the same like 3',5'-di-methyl or 3',5'-di-tert-butyl. Another option is 3',5'-di-tert-butyl-4-methoxyphenyl.

$R^5$ is a linear or branched $C_{1-6}$-alkyl group such as methyl, ethyl, n-propyl, i-propyl, n-butyl, i-butyl, sec-butyl and tert-butyl, $C_{7-20}$ arylalkyl, $C_{7-20}$ alkylaryl group or $C_{6-20}$ aryl group.

$R^5$ is a preferably a linear or branched $C_{1-6}$ alkyl group or $C_{6-20}$ aryl group, more preferably a linear $C_{1-4}$ alkyl group, even more preferably a $C_1$ or $C_2$-alkyl group and most preferably methyl.

$R^6$ is a $C(R^8)_3$ group, with $R^8$ being a linear or branched $C_{1-6}$ alkyl group.

Preferably each $R^8$ are the same or different with $R^8$ being a linear or branched $C_{1-4}$-alkyl group, more preferably with $R^8$ being the same and being a $C_1$ or $C_2$-alkyl group. Most preferably, all $R^8$ groups are methyl.

In a preferred embodiment, the invention provides a metallocene complex of formula (II)

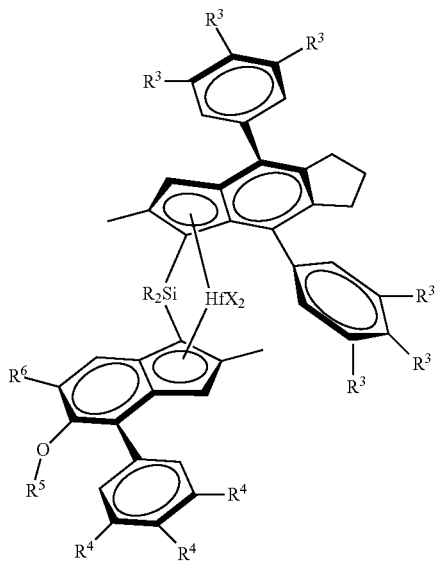

(II)

each X is a sigma-ligand selected from chloro, benzyl and $C_{1-6}$-alkyl;

$R_2Si$ is $Me_2Si$ or $Et_2Si$;

each $R^3$ and $R^4$ are independently the same or can be different and are hydrogen, a linear or branched $C_{1-6}$-alkyl group or —OY group where Y is a $C_{1-6}$ alkyl group; wherein (A) at least one $R^3$ per phenyl group and at least one $R^4$ is not hydrogen, and at least one $R^3$ per phenyl group and at least one $R^4$ is hydrogen; or (B) at least one $R^3$ is an —OY group, wherein Y is a is a $C_{1-6}$ hydrocarbyl group, in the 4 position of each phenyl ring and the two other $R^3$ groups are tert-butyl groups; and/or (C) at least one $R^4$ is an —OY group, wherein Y is a is a $C_{1-6}$ hydrocarbyl group in the 4-position of the phenyl ring and the two other $R^4$ groups are tert-butyl groups;

$R^5$ is a linear or branched $C_{1-6}$-alkyl group;

$R^6$ is a —$C(R^8)_3$ group, with $R^8$ being a linear or branched $C_1$ or $C_2$ alkyl group.

More preferably, the metallocene complex of the invention is one of formula (III)

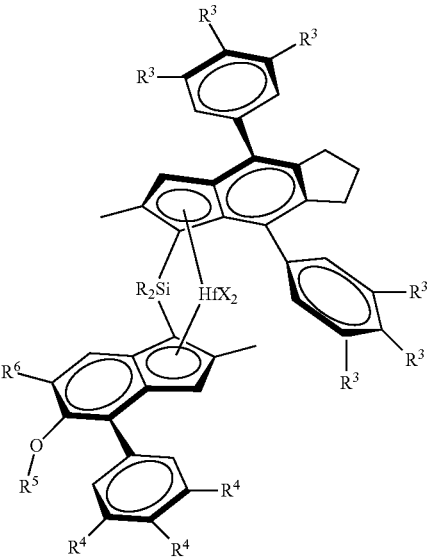

(III)

each X is the same and is a sigma-ligand selected from chloro, benzyl and $C_{1-6}$ alkyl;

$R_2Si$ is $Me_2Si$ or $Et_2Si$;

each non-hydrogen $R^3$ is the same and each non-hydrogen $R^4$ is the same;

$R^3$ is hydrogen, a linear or branched $C_{1-6}$-alkyl group;

$R^4$ is hydrogen, a linear or branched $C_{1-6}$-alkyl group;

wherein at least one $R^3$ per phenyl group and at least one $R^4$ is not hydrogen, and wherein at least one $R^3$ per phenyl group and at least one $R^4$ is hydrogen, $R^5$ is a linear or branched $C_{1-4}$-alkyl group; and $R^6$ is a —$C(R^8)_3$ group, with $R^8$ being a linear or branched $C_1$ or $C_2$ alkyl group.

In a further preferred embodiment, the invention provides a metallocene complex of formula (IVa) to (IVd)

Formula (IVa)

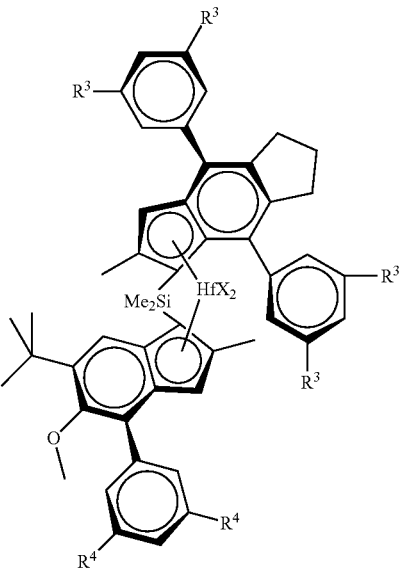

Formula (IVb)

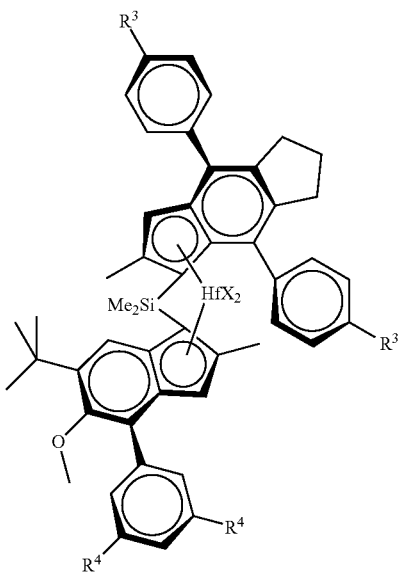

Formula (IVc)

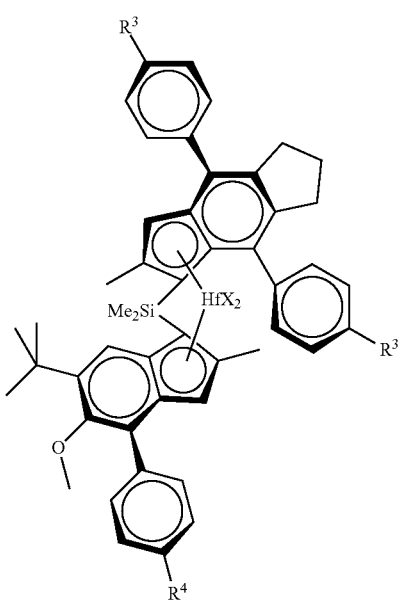

Formula (IVd)

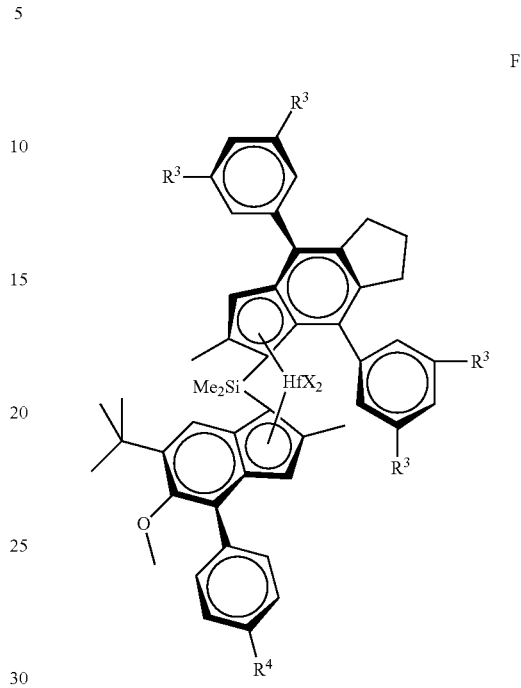

wherein each X is the same and is chloro, benzyl or $C_{1-6}$-alkyl, preferably chloro, benzyl or methyl;

each $R^3$ and $R^4$ are independently the same or can be different and are a linear or branched $C_{1-6}$-alkyl group.

Preferably the $R^3$ groups are the same. Preferably the $R^4$ groups are the same. Specific metallocene complexes of the invention include:

rac-anti-dimethylsilanediyl[2-methyl-4,8-bis-(3',5'-dimethylphenyl)-1,5,6,7-tetrahydro-s-indacen-1-yl] [2-methyl-4-(3',5'-dimethylphenyl)-5-methoxy-6-tert-butylinden-1-yl] Hafnium dichloride (MC-1), rac-anti-dimethylsilanediyl[2-methyl-4,8-bis-(4'-tert-butylphenyl)-1,5,6,7-tetrahydro-s-indacen-1-yl][2-methyl-4-(3',5'-dimethyl-phenyl)-5-methoxy-6-tert-butylinden-1-yl] Hafnium dichloride (MC-2), rac-anti-dimethylsilanediyl[2-methyl-4,8-bis-(4'-tert-butylphenyl)-1,5,6,7-tetrahydro-s-indacen-1-yl][2-methyl-4-(4'-tert-butylphenyl)-5-methoxy-6-tert-butyl-inden-1-yl] Hafnium dichloride (MC-3), rac-anti-dimethylsilanediyl[2-methyl-4,8-bis-(3',5'-dimethylphenyl)-1,5,6,7-tetrahydro-s-indacen-1-yl][2-methyl-4-(3',5'-di-tert-butyl-phenyl)-5-methoxy-6-tert-butylinden-1-yl] Hafnium dichloride (MC-4), rac-anti-dimethylsilanediyl[2-methyl-4,8-bis-(3',5'-dimethylphenyl)-1,5,6,7-tetrahydro-s-indacen-1-yl][2-methyl-4-(4'-tert-butylphenyl)-5-methoxy-6-tert-butyl-inden-1-yl] Hafnium dichloride (MC-5), or their corresponding dimethyl analogues.

MC-1
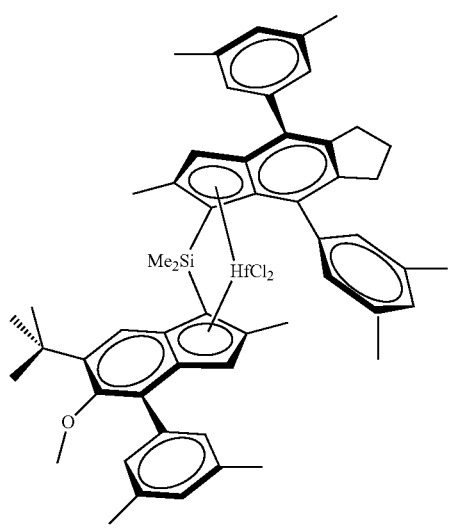
MC-2
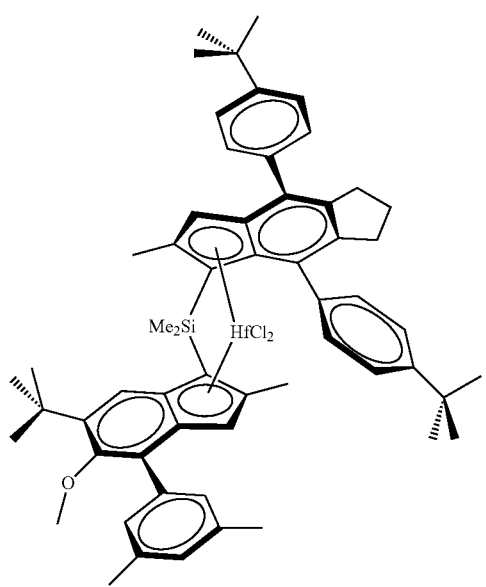
MC-3
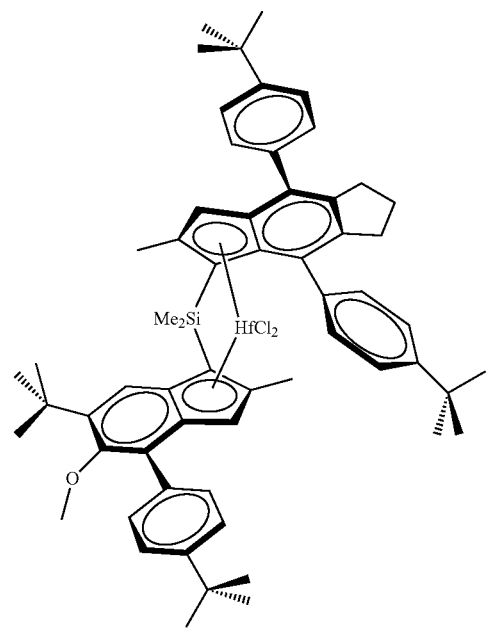
MC-4
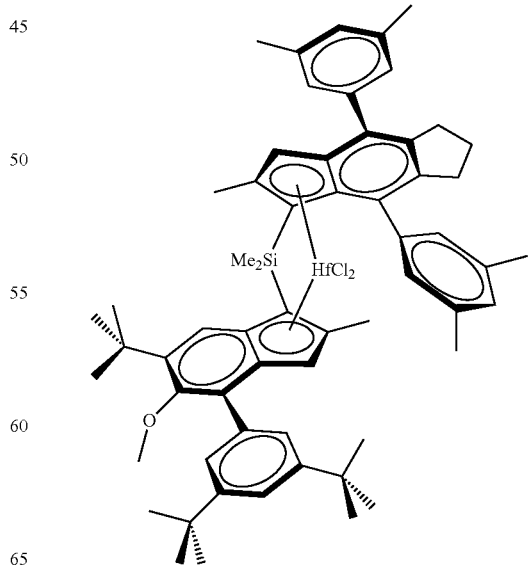

MC-5

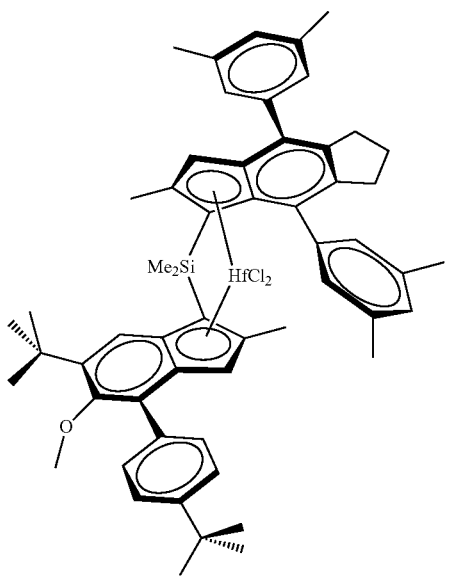

For the avoidance of doubt, any narrower definition of a substituent offered above can be combined with any other broad or narrowed definition of any other substituent.

Throughout the disclosure above, where a narrower definition of a substituent is presented, that narrower definition is deemed disclosed in conjunction with all broader and narrower definitions of other substituents in the application.

Synthesis

The ligands required to form the catalysts of the invention can be synthesised by any process and the skilled organic chemist would be able to devise various synthetic protocols for the manufacture of the necessary ligand materials. WO2007/116034 discloses the necessary chemistry and is herein incorporated by reference. Synthetic protocols can also generally be found in WO2002/02576, WO2011/135004, WO2012/084961, WO2012/001052, WO2011/076780, WO2015/158790 and WO 2019/179959, wherein the protocol in WO 2019/179959, which is reproduced below, is most relevant for the present invention. The examples section also provides the skilled person with sufficient direction.

Synthesis of the Ligand of the Metallocene Complex of Formula (I) Comprising the Two $(R^3)_3$-phenyl-group Substituents, Preferably Indacenyl Ligand Synthesis The ligand of the metallocenes as disclosed in WO2018/122134 include two different indenes, one methoxyindene and one indacene. The synthesis of the methoxyindene is straightforward and gives high yield, while the synthesis of the indacene requires several steps, as shown in scheme 1 for the case of the 4-(4-tert-butylphenyl)indacene:

Scheme 1

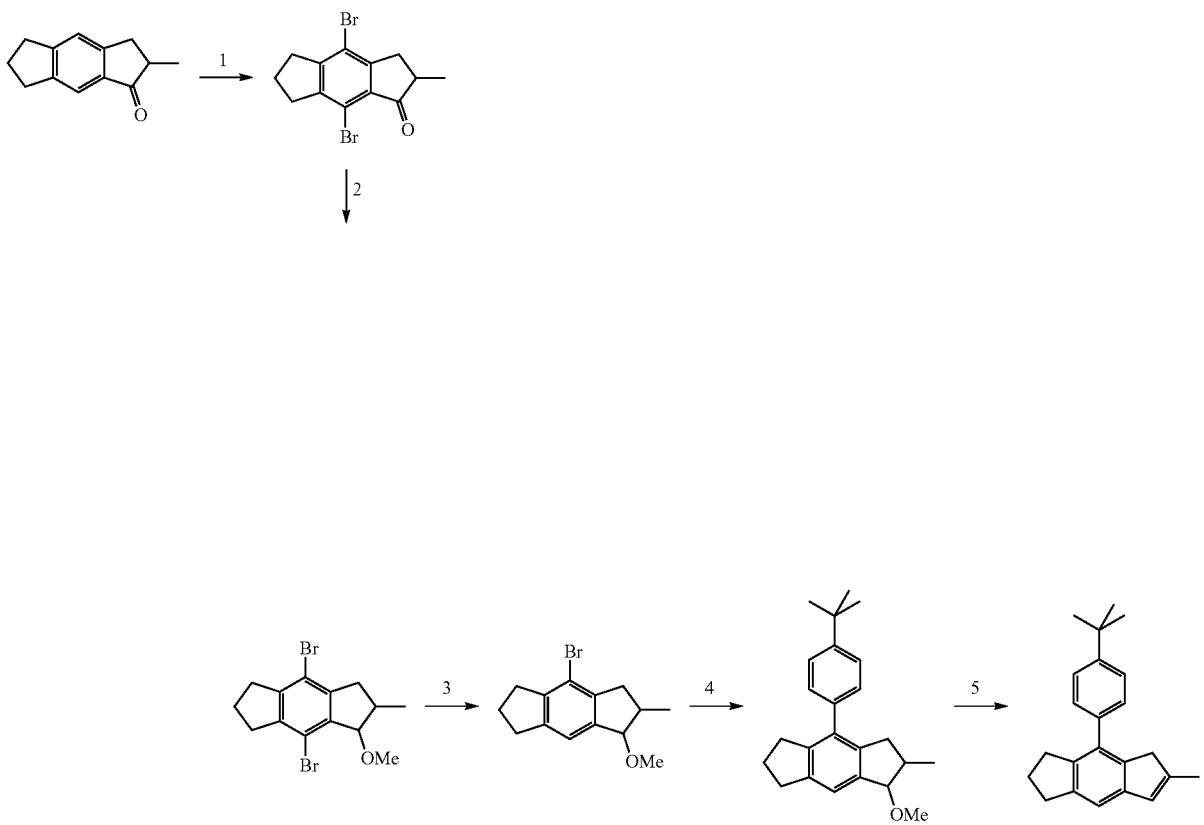

The ligand of the metallocene catalyst complex of formula (I) comprising the two (R³)₃-phenyl-group substituents, preferably the indacene ligand used in the synthesis of the inventive metallocene complexes, which is the structural analogue of above structure, can be obtained with one step less, as shown in scheme 2:

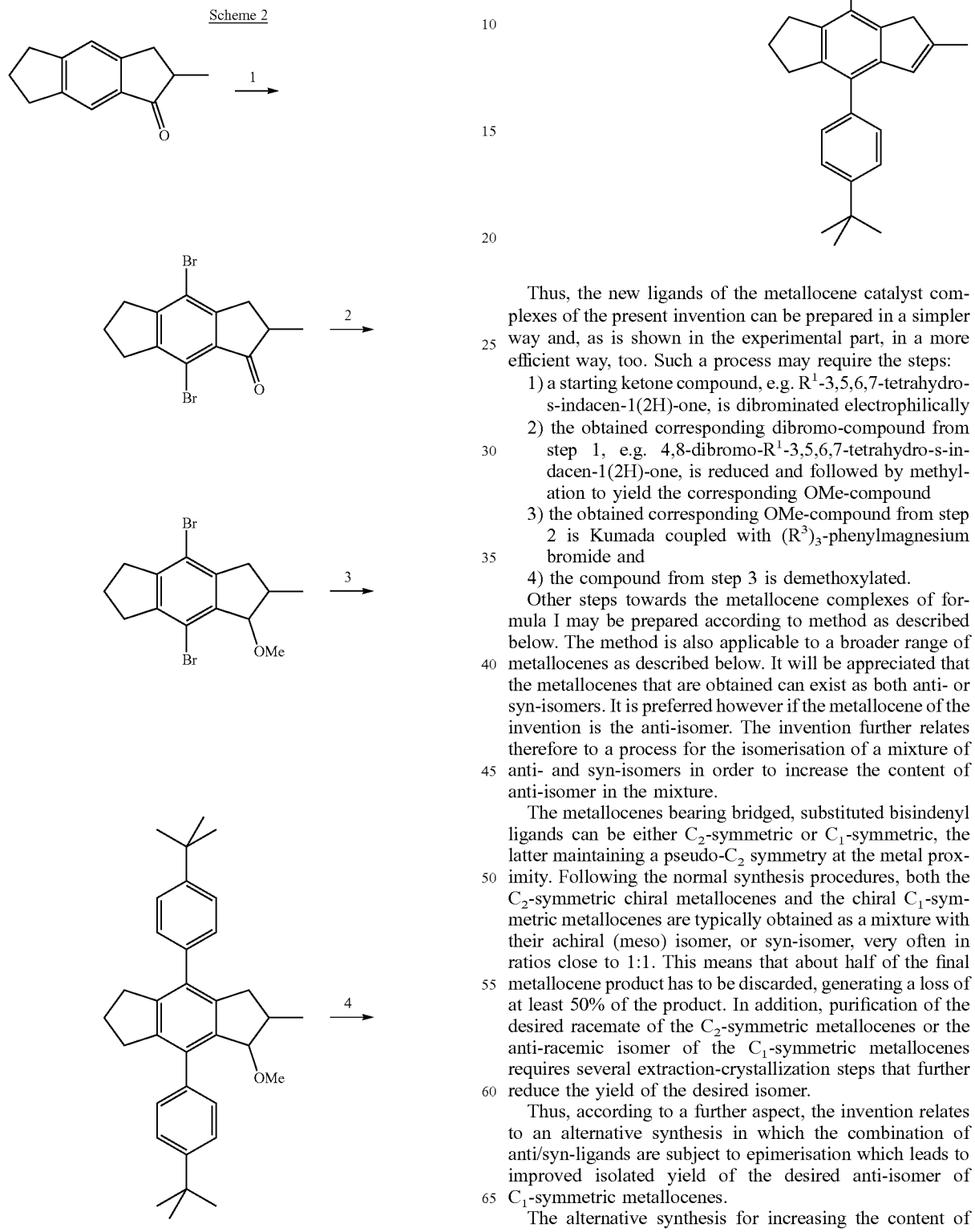

Thus, the new ligands of the metallocene catalyst complexes of the present invention can be prepared in a simpler way and, as is shown in the experimental part, in a more efficient way, too. Such a process may require the steps:
1) a starting ketone compound, e.g. R¹-3,5,6,7-tetrahydro-s-indacen-1(2H)-one, is dibrominated electrophilically
2) the obtained corresponding dibromo-compound from step 1, e.g. 4,8-dibromo-R¹-3,5,6,7-tetrahydro-s-indacen-1(2H)-one, is reduced and followed by methylation to yield the corresponding OMe-compound
3) the obtained corresponding OMe-compound from step 2 is Kumada coupled with (R³)₃-phenylmagnesium bromide and
4) the compound from step 3 is demethoxylated.

Other steps towards the metallocene complexes of formula I may be prepared according to method as described below. The method is also applicable to a broader range of metallocenes as described below. It will be appreciated that the metallocenes that are obtained can exist as both anti- or syn-isomers. It is preferred however if the metallocene of the invention is the anti-isomer. The invention further relates therefore to a process for the isomerisation of a mixture of anti- and syn-isomers in order to increase the content of anti-isomer in the mixture.

The metallocenes bearing bridged, substituted bisindenyl ligands can be either C₂-symmetric or C₁-symmetric, the latter maintaining a pseudo-C₂ symmetry at the metal proximity. Following the normal synthesis procedures, both the C₂-symmetric chiral metallocenes and the chiral C₁-symmetric metallocenes are typically obtained as a mixture with their achiral (meso) isomer, or syn-isomer, very often in ratios close to 1:1. This means that about half of the final metallocene product has to be discarded, generating a loss of at least 50% of the product. In addition, purification of the desired racemate of the C₂-symmetric metallocenes or the anti-racemic isomer of the C₁-symmetric metallocenes requires several extraction-crystallization steps that further reduce the yield of the desired isomer.

Thus, according to a further aspect, the invention relates to an alternative synthesis in which the combination of anti/syn-ligands are subject to epimerisation which leads to improved isolated yield of the desired anti-isomer of C₁-symmetric metallocenes.

The alternative synthesis for increasing the content of anti-isomer in a mixture of anti- and syn-isomers of a metallocene complex is applied to metallocene complexes according to formula 1a and subformulae as defined below and comprises a step of treating said mixture with at least one epimerisation agent selected from the group consisting of $R^y_4NBr$, $R^y_4NCl$ and LiCl, wherein each $R^y$ is independently selected from the group consisting of $C_1$-$C_{20}$ hydrocarbyl.

In case the epimerisation agent is selected from the group consisting of $R^y_4NBr$ and $R^y_4NCl$ with $R^y$ being independently selected from the group consisting of $C_1$-$C_{20}$ hydrocarbyl, the treatment preferably takes place in the presence of a liquid phase which comprises or substantially consists of at least one non-aromatic chlorinated compound (aa), or at least one non-cyclic ether compound (bb), with the embodiment (aa) being even more preferred.

In this context, the phrase "substantially consists of" denotes a composition which comprises more than 90 wt.-% of the respective compound, more preferably more than 95 wt.-%, even more preferably more than 98 wt.-%, particularly more than 99 wt.-%.

Specific examples for the non-aromatic chlorinated compound (aa) are chloroform, methylene chloride, chloroethane, tetrachloroethane or the like, with chloroform, chloroethane and methylene chloride being particularly preferred. The latter compounds are particularly preferred because they are polar and low-boiling.

The treatment of said mixture in a liquid phase according to (aa) preferably takes place at a temperature below 80° C., more preferably below 65° C., even more preferably below 50° C., for example between −30° C. and 50° C. In this context, it is most preferred, if the mixture of anti- and syn-isomers of a metallocene complex according to formula 1a below is treated with at least one epimerisation agent selected from the group consisting of $R^y_4NBr$, $R^y_4NCl$ in a liquid phase which essentially consists of at least one non-aromatic chlorinated compound (aa) at a temperature between 0° C. and 50° C.

A specific example for the non-cyclic ether compound (bb) is dibutylether. In case the mixture of anti- and syn-isomers of a metallocene complex according to formula 1a below is treated with at least one epimerisation agent selected from the group consisting of $R^y_4NBr$, $R^y_4NCl$ in a liquid phase according to (bb), the temperature is preferably set to a temperature above 100° C., more preferably to a temperature in range from 100° C. to 150° C., even more preferably to a temperature in the range from 100° C. to 140° C., particularly, to a temperature in the range from 110° to 130° C.

Alternatively, if the epimerisation agent is LiCl, the treatment of the mixture of anti- and syn-isomers of a metallocene complex according to formula 1a preferably takes place in a liquid phase comprising or essentially consisting of an ether, particularly tetrahydrofuran (THF). Again this context, the phrase "substantially consists of" denotes a composition which comprises more than 90 wt.-% of the respective compound, more preferably more than 95 wt.-%, even more preferably more than 98 wt.-%, particularly more than 99 wt.-%.

If LiCl is used as the epimerisation agent it is preferred, if the temperature is kept in a range of 40° C. to 90° C. during the treatment. An even more preferred temperature range is 55° C. to 85° C. In a preferred embodiment of the synthesis for increasing the content of anti-isomer, LiCl and a cyclic ether, such as THF, are added to the mixture of anti- and syn-isomers of a metallocene complex according to formula 1a.

In all of the embodiments of the synthesis outlined above, the mixture of anti- and syn-isomers of a metallocene complex according to formula 1a is preferably subjected to the treatment for at least 1 hour, more preferably for at least 5 hours, even more preferably for at least 15 hours, particularly for at least 40 hours.

In a preferred embodiment the epimerisation agent is selected from the group consisting of $R^y_4NBr$, $R^y_4NCl$ and LiCl, with $R^y$ being independently selected from the group consisting of $C_1$-$C_{10}$ hydrocarbyl. It is further preferred if $R^y$ is independently selected from the group consisting of $C_1$-$C_8$ hydrocarbyl. It is particularly advantageous if the epimerisation agent is either triethylbenzylammoniumchloride (TEBAC) or LiCl.

The metallocenes that are suitable for the above described synthesis are the metallocenes of formulae 1a, 2a, 3a, 4a or the metallocenes of formulae 5-8 as described below.

In the metallocene according to formula 1a below

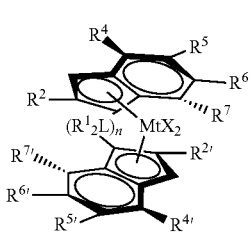

Formula 1a

Mt is Zr or Hf;
each X is a sigma-ligand;
n is 1 or 2;
L is C, Si, or Ge, and
the two $R^1$ groups, which can be the same or can be different, are hydrogen or $C_{1-20}$ hydrocarbyl groups, optionally containing up to 2 silicon atoms or other heteroatoms, and are preferably $C_{1-8}$ hydrocarbyl groups, most preferably one $R^1$ is hydrogen, methyl, ethyl, n-propyl, i-propyl, cyclopropyl, n-butyl, i-butyl, sec-butyl, n-pentyl, i-pentyl, cyclopentyl, hexyl, octyl, and the other $R^1$ is selected from methyl, ethyl, n-propyl, i-propyl, cyclopropyl, n-butyl, i-butyl, sec-butyl, n-pentyl, i-pentyl, cyclopentyl, n-hexyl, cyclohexyl, trimethylsilyl, phenyl, o-tolyl, m-tolyl, p-tolyl, xylyl, biphenyl, p-trimethylsilylphenyl, p-triethylsilyl, or the $LR^1_2$ group is 9-silafluorenyl;
$R^2$ and $R^{2'}$ are, independently from each other, hydrogen, $OSiR_3$, (where each R is independently a $C_{1-10}$ hydrocarbyl) or a $C_{1-22}$ hydrocarbyl group, preferably a $CH_2$—$R^x$ group, or a CH—$R^x_2$ with $R^x$ being hydrogen or a linear or branched $C_{1-6}$-alkyl group, $C_{3-8}$ cycloalkyl group, or $C_{6-10}$ aryl group;
$R^4$, $R^5$, $R^6$, $R^{4'}$, $R^{5'}$, $R^{6'}$ are independently the same or can be different and are hydrogen or a hydrocarbyl group, optionally containing heteroatoms or Si atoms;
$R^7$ is a $C_2$-$C_{22}$ hydrocarbyl group, optionally containing one or two silicon atoms or one or more heteroatoms selected from the group consisting of O, N, S, P and combinations thereof;
$R^{7'}$ is hydrogen or a $C_{1-3}$ hydrocarbyl group or an $OCH_3$ group; and optionally, two adjacent $R^4$, $R^5$, $R^6$, $R^7$, $R^{4'}$, $R^{5'}$, $R^{6'}$, $R^{7'}$ groups can be part of an aromatic or heteroaromatic ring including the indenyl carbons to which they are bonded.

Ideally, two adjacent $R^4$, $R^5$, $R^6$, $R^7$, $R^{4'}$, $R^{5'}$, $R^{6'}$, $R^{7'}$ groups form a heteroaromatic 4 to 8 membered ring including the indenyl carbons to which they are bonded.

In the metallocene complex of formula 2a below

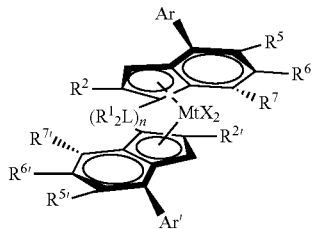

Formula 2a

Mt is Zr or Hf;
n is 1;
each X is a sigma-ligand;
L is C, Si, or Ge, and
the two $R^1$ groups, which can be the same or can be different, are hydrogen or $C_{1-20}$ hydrocarbyl groups, optionally containing up to 2 silicon atoms or other heteroatoms, and are preferably $C_{1-8}$ hydrocarbyl groups, most preferably one $R^1$ is hydrogen, methyl, ethyl, n-propyl, i-propyl, cyclopropyl, n-butyl, i-butyl, sec-butyl, n-pentyl, i-pentyl, cyclopentyl, hexyl, octyl, and the other $R^1$ is selected from methyl, ethyl, n-propyl, i-propyl, cyclopropyl, n-butyl, i-butyl, sec-butyl, n-pentyl, i-pentyl, cyclopentyl, n-hexyl, cyclohexyl, trimethylsilyl, phenyl, o-tolyl, m-tolyl, p-tolyl, xylyl, biphenyl, p-trimethylsilylphenyl, p-triethylsilyl, or the $LR^1_2$ group is 9-silafluorenyl;

Ar is a $C_6$-$C_{22}$ aryl group, or a $C_3$-$C_{20}$ heteroaryl group containing up to two heteroatoms selected from the group consisting of O, S, N, P and combinations thereof, wherein each C, N and P is optionally substituted;

$R^2$ and $R^{2'}$ are, independently from each other, linear or branched $C_{1-22}$ hydrocarbyl groups, optionally containing one heteroatom selected from the group consisting of O, S, N, P and Si;

$R^5$, $R^6$, $R^{5'}$, $R^{6'}$ are independently the same or can be different and are hydrogen or a hydrocarbyl group, optionally containing Si or other heteroatoms;

$R^7$ is a $C_{3-22}$ hydrocarbyl group, optionally containing up to two silicon atoms or up to two heteroatoms selected from the group consisting of O, S, N, P and combinations thereof; and $R^{7'}$ is hydrogen, a $C_{1-3}$ hydrocarbyl group or an $OCH_3$ group.

It will be appreciated that where $R^5$, $R^6$, $R^{5'}$, $R^{6'}$ contain Si or other heteroatoms these may be present at any point on the substituent, e.g. $R^{5'}$ may form an O-hydrocarbyl group.

In the metallocene complex of formula 3a below

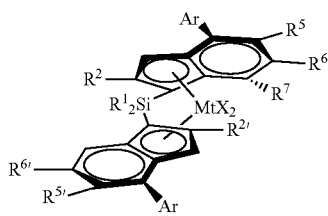

Formula 3a

Mt is Zr or Hf;
each X is a sigma-ligand selected from chloro, benzyl and $C_{1-6}$-alkyl;
the two $R^1$ groups, which can be the same or can be different, are hydrogen or $C_{1-20}$ hydrocarbyl groups, optionally containing up to 2 silicon atoms or other heteroatoms, and are preferably $C_{1-8}$ hydrocarbyl groups, most preferably one $R^1$ is hydrogen, methyl, ethyl, n-propyl, i-propyl, cyclopropyl, n-butyl, i-butyl, sec-butyl, n-pentyl, i-pentyl, cyclopentyl, hexyl, octyl, and the other $R^1$ is selected from methyl, ethyl, n-propyl, i-propyl, cyclopropyl, n-butyl, i-butyl, sec-butyl, n-pentyl, i-pentyl, cyclopentyl, n-hexyl, cyclohexyl, trimethylsilyl, phenyl, o-tolyl, m-tolyl, p-tolyl, xylyl, biphenyl, p-trimethylsilylphenyl, p-triethylsilyl, or $R^1_2Si$ is 9-silafluorenyl;

Ar are, independently from each other, phenyl or substituted phenyl, naphthyl or substituted naphthyl, anthracenyl, piridyl, thiophenyl, 5-alkylthiophen-2-yl, benzothiophenyl, pyrrolyl, furanyl, 5-alkylfuran-2-yl;

$R^2$ and $R^{2'}$ are, independently from each other, linear or branched $C_{1-22}$ hydrocarbyl groups, optionally containing one heteroatom selected from the group consisting of O, S, N, P and Si;

$R^5$, $R^6$ are, independently from each other, hydrogen or a hydrocarbyl group; and optionally the $R^5$, $R^6$ groups can be part of a 4 to 8 membered aromatic ring including the indenyl carbons to which they are bonded;

$R^{5'}$ is hydrogen, a hydrocarbyl group or an OY group, in which Y is a $C_{1-10}$ hydrocarbyl group;

$R^{6'}$ is a secondary hydrocarbyl group of formula $CH-R^x_2$ or tertiary hydrocarbyl group of formula $CR^x_3$ with $R^x$ being a linear or branched $C_{1-6}$-alkyl group, $C_{3-8}$ cycloalkyl group, $C_{6-10}$ aryl group; and optionally the $R^{5'}$, $R^{6'}$ groups can be part of a 4 to 7 membered aromatic ring including the indenyl carbons to which they are bonded.

In a preferred embodiment, if $R^{6'}$ in formula 3a is a tertiary hydrocarbyl group, $R^{5'}$ is hydrogen.

In the metallocene complex of formula 4a below

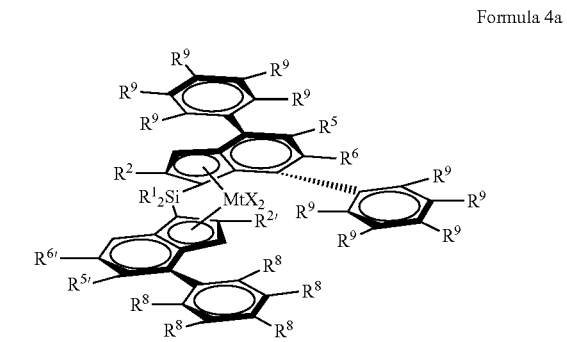

Formula 4a

Mt is Zr or Hf;
each X is a sigma-ligand selected from chloro, benzyl and $C_{1-6}$-alkyl;
the two $R^1$ groups are, independently from each other, hydrogen or $C_{1-20}$ hydrocarbyl groups, optionally containing up to 2 silicon atoms or other heteroatoms, and are preferably $C_{1-8}$ hydrocarbyl groups, most preferably one $R^1$ is selected from hydrogen, methyl, ethyl, n-propyl, i-propyl, cyclopropyl, n-butyl, i-butyl, sec-butyl, n-pentyl, i-pentyl, cyclopentyl, hexyl, octyl, and the second $R^1$ is selected from methyl, ethyl, n-propyl, i-propyl, cyclopropyl, n-butyl, iso-butyl, sec-butyl, n-pentyl, i-pentyl, cyclopentyl, n-hexyl, cyclohexyl, trimethylsilyl, phenyl, o-, m-, p-tolyl, xylyl, biphenyl, p-trimethylsilylphenyl, p-triethylsilyl, or $R^1{}_2Si$ is 9-silafluorenyl;

$R^2$ and $R^{2'}$ are, independently from each other, a methyl, ethyl, n-propyl, i-propyl, cyclopropyl, n-butyl, s-butyl, i-butyl, pentyl, hexyl, a $C_{6\text{-}10}$ aryl group or a thiophenyl, 5-alkylthiophen-2-yl, pyrrolyl, furanyl, 5-alkyl-furan-2-yl group;

$R^5$ and $R^6$ are, independently from each other, hydrogen or a $C_{1\text{-}20}$ hydrocarbyl group, optionally containing up to 2 silicon atoms or heteroatoms, or —CH=, —CY=, —CH$_2$—, —CHY— or —CY$_2$— groups that are part of a cyclic structure of 4 to 7 atoms including the indenyl carbons to which they are bonded;

$R^{5'}$ is a $C_{1\text{-}6}$ hydrocarbyl or an OY group;

$R^{6'}$ is a tertiary hydrocarbyl of formula $CR^x{}_3$ with $R^x$ being a linear or branched $C_{1\text{-}6}$-alkyl group, $C_{3\text{-}8}$ cycloalkyl group, $C_{6\text{-}10}$ aryl group;

each $R^8$ and $R^9$ are independently the same or can be different and are hydrogen, a linear or branched $C_1$-$C_6$-alkyl group, an OY group, a $C_{7\text{-}20}$ arylalkyl group, a $C_{7\text{-}20}$ alkylaryl group or a $C_{6\text{-}20}$ aryl group, and optionally two adjacent $R^8$ or $R^9$ groups can be part of a ring including the phenyl carbons to which they are bonded;

wherein at each occurrence Y is a $C_{1\text{-}10}$ hydrocarbyl group.

The alternative synthesis as described above allows the production of a mixture with an anti- to syn-isomer ratio of at least 90:10, preferably at least 95:5, more preferably at least 97:3, when starting from an anti-rich mixture with an anti- to syn-isomer ratio of at least 65:35. Subsequent purification is no longer necessary. The pure anti-isomer can be obtained with a single crystallisation or solvent extraction step. Further metallocenes that are suitable for this alternative synthesis process of the invention are bridged asymmetric bisindenyl metallocenes in their racemic configuration, having the structure described by formula 5:

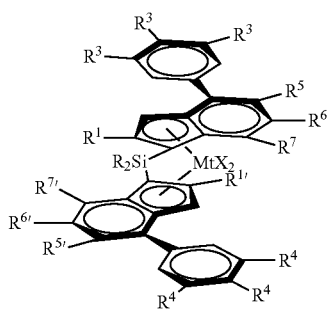

Formula 5 wherein Mt is Zr or Hf;
each X is a sigma-ligand;
the two R groups, which can be the same or can be different, are $C_{1\text{-}20}$ hydrocarbyl groups, optionally containing up to 2 silicon atoms or heteroatoms, and are preferably $C_{1\text{-}8}$ hydrocarbyl groups; most preferably one R is methyl, ethyl, n-propyl or i-propyl, and the other R is selected from methyl, ethyl, n-propyl, i-propyl, n-butyl, i-butyl, pentyl, hexyl, cyclohexyl and phenyl;

$R^1$ and $R^{1'}$ are the same or can be different;

$R^1$ is a $CH_2$—$R^2$ group, with $R^2$ being H or a linear or branched $C_{1\text{-}6}$-alkyl group, $C_{3\text{-}8}$ cycloalkyl group, $C_{6\text{-}10}$ aryl group;

$R^{1'}$ is a $C_{1\text{-}20}$ hydrocarbyl group; preferably, $R^1$ and $R^{1'}$ are the same and are linear or branched $C_{1\text{-}6}$-alkyl groups;

each $R^5$ and $R^6$ are independently hydrogen or a $C_{1\text{-}20}$ hydrocarbyl group, optionally containing up to 2 silicon atoms or heteroatoms, and preferably are taken together to form —CH=, —CY=, —CH$_2$—, —CHY— or —CY$_2$— groups that are part of a cyclic structure of 4 to 7 atoms, including the carbon atoms at positions 5 and 6 of the corresponding indenyl ligand, Y is a $C_{1\text{-}10}$ hydrocarbyl group;

each $R^3$ and $R^4$ are independently the same or can be different and are hydrogen, a linear or branched $C_1$-$C_6$-alkyl group, an OY group or a $C_{7\text{-}20}$ arylalkyl, $C_{7\text{-}20}$ alkylaryl group or $C_{6\text{-}20}$ aryl group, and optionally two adjacent $R^3$ or $R^4$ groups can be part of a ring including the phenyl carbons to which they are bonded;

$R^{5'}$ is hydrogen or a linear, branched or cyclic $C_1$-$C_6$-alkyl group, $C_{7\text{-}20}$ arylalkyl, $C_{7\text{-}20}$ alkylaryl group or $C_6$-$C_{20}$-aryl group, or an OY group;

$R^{6'}$ is hydrogen or a linear, branched or cyclic $C_1$-$C_6$-alkyl group, $C_{7\text{-}20}$ arylalkyl, $C_{7\text{-}20}$ alkylaryl group or $C_6$-$C_{20}$-aryl group, or an OY group;

with the proviso that when $R^{5'}$ is an —OY group, then $R^{6'}$ is a —$C(R^8)_3$ group, with $R^8$ being a linear or branched $C_1$-$C_6$ alkyl group;

$R^7$ is a $C_{1\text{-}20}$ hydrocarbyl group optionally containing up to two silicon atoms or heteroatoms or is a group 3,4,5-tri$R^3$-phenyl;

$R^{7'}$ is hydrogen or a $C_{1\text{-}3}$ hydrocarbyl group or an OY group;

and with the proviso that $R^{6'}$ can be hydrogen only when $R^{7'}$ is different from hydrogen.

Preferably, the metallocenes that are suitable for the synthesis process of the invention are bridged asymmetric bisindenyl metallocenes in their racemic configuration, having the structure described by formula 6:

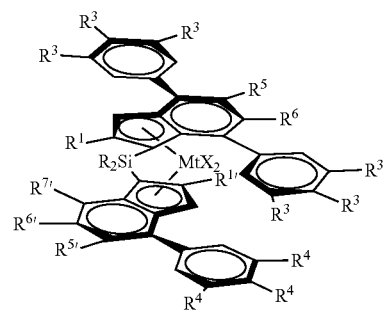

Formula 6 wherein Mt, X, R, $R^1$, $R^{1'}$, $R^3$, $R^4$, $R^5$, $R^{5'}$, $R^6$, $R^{6'}$ and $R^{7'}$ are as described above.

Most preferably, the metallocenes that are suitable for the synthesis process of the invention are bridged asymmetric bisindenyl metallocenes in their racemic configuration, having the structure described by formula 7:

Formula 7

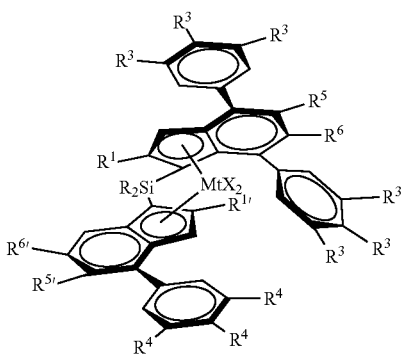

wherein Mt, X, R, $R^1$, $R^{1'}$, $R^3$, $R^4$, $R^5$, $R^{5'}$, $R^6$, and $R^{6''}$ are as described above.

Most preferably, the metallocenes that are suitable for the synthesis process of the invention are bridged asymmetric bisindenyl metallocenes in their racemic configuration, having the structure described by formula 8:

Formula 8

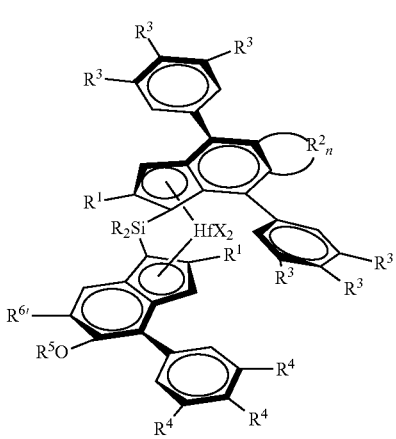

wherein X, R, $R^1$, $R^{1'}$, $R^3$, $R^4$, $R^5$, $R^{5'}$, $R^6$, and $R^{6'}$ are as described above for formula 5 and each $R^2$ is independently a —CH=, —CY=, —CH$_2$—, —CHY— or —CY$_2$— group, wherein Y is a $C_{1-6}$ hydrocarbyl group and where n is 2-6. In formula 8, $R^5$ is especially a $C_{1-10}$ hydrocarbyl group.

Preferred options for the substituents described above also apply to formulae 5 to 7. Accordingly, inventive metallocenes of formula I can be synthetized according to the alternative method as herein described.

Typically the isomerization is performed at one or more temperatures in the range of room temperature to 200° C., preferably in the range of 0 to 150° C., and more preferably in the range of room temperature to 80° C. The rate of isomerization varies with temperature and thus is usually more rapid at higher temperatures and less rapid at lower temperatures. Accordingly, the isomerization reaction is performed for a period of time sufficient under the conditions employed to achieve a suitable or desired amount of isomerization. Typically isomerization periods fall in the range of 0.5 to 96 hours. With isomerization temperatures in the range of room temperature to 80° C., periods in the range of 1 to 48 hours are preferred. A combination of suitable time and temperature for the epimerisation can be found by a person skilled in the art. It is desirable to agitate the isomerization mixture during at least a substantial portion of the isomerization reaction period.

However, it should be noted that the rate of isomerization also varies with the type of liquid phase that is used. Liquid phases that are suitable for use as an isomerization medium in the synthesis processes comprise or essentially consist of polar aprotic organic compounds, such as ethers, tertiary amines, and/or non-aromatic chlorinated compounds.

Ethers used in forming the isomerization medium preferably comprise cyclic and acyclic monoethers and polyethers that exist in the liquid state at, and preferably below, the lowest isomerization temperature to be used in the particular isomerization operation being conducted. However it is possible to employ ethers which exist in the solid state at the lowest isomerization temperature being used, provided such ethers are used in admixture with an additional inert liquid solvent such as a liquid hydrocarbon or a liquid tertiary amine in which the ether is soluble at the lowest isomerization temperature, so as to thereby provide a continuous liquid phase in which the isomerization is to be performed.

Typical ethers which may be used include acyclic ethers, such as dialkyl ethers, dicycloalkyl ethers, diaralkyl ethers, diaryl ethers, alkyl-aryl ethers, and alkyl-cycloalkyl ethers; dialkyl ethers of diols such as dialkyl ethers of such diols as ethylene glycol, propylene glycol, and 1,4-butanediol; trialkyl ethers of triols such as trialkyl ethers of glycerine, dialkyl ethers of diethylene glycol; dialkyl ethers of triethylene glycol; dialkyl ethers of tetraethylene glycol; and similar liquid acyclic ethers. Preferred for use in forming the isomerization medium are cyclic ethers and polyethers having at least 5-membered rings, such as tetrahydrofuran, 2,3-benzofuran, alkyldihydrofurans, alkyltetrahydrofurans, alkyltetrahydrofurfuryl ethers, alkyldihydropyrans, tetrahydropyran, 1,4-dioxane, 1,3-dioxolane, and similar liquid cyclic ethers. When another type of inert solvent (e.g., an inert liquid hydrocarbon solvent, a liquid tertiary amine, a liquid mixture of hydrocarbon and tertiary amine, or the like) is used in combination with one or more ethers to form the isomerization medium, the resultant liquid medium preferably contains at least 70% by volume, more preferably at least 80% and most preferably at least 90% by volume of the ether(s).

The proportions between the ether-containing liquid phase and the mixture of syn- and anti-metallocenes must be such as to form a fine solution, but also a slurry wherein a portion of the metallocene is in solution and a portion of the metallocene is in the form of solid particles in the continuous liquid phase. For efficient operation the proportions used will typically be such as to provide a solution or slurry wherein the mixture contains an amount of solid particles falling in the range of 0 to 95 wt %.

The manner by which the initial mixture of syn- and anti-metallocene isomers is produced or formed is not critical. What is important is that the initial mixture be amenable to treatment pursuant to this invention such that the anti-isomer content of the mixture can be increased by the practice of this invention.

Thus viewed from another aspect the invention provides a process for increasing the content of anti-isomer in a mixture of anti- and syn-metallocene isomers, such as those of formulae 1a to 4a or of formulae 5 to 8 as hereinbefore defined;
  wherein the process comprises adding said mixture to a liquid phase comprising at least one ether compound or at least one non-aromatic chlorinated compound at a temperature of from 0 to 200° C., preferably 0 to 150° C., more preferably 20 to 80° C., to form a solution of said mixture in the liquid phase or so as to form a slurry in which a portion of the mixture is in the form of solid particles in the liquid phase and a portion of the mixture dissolves in the ether or the non-aromatic chlorinated compound;

and allowing the anti-isomer content of the mixture to increase by epimerisation in said liquid phase.

In particular, the invention relates to the increase in racemic anti-isomer from a mixture of racemic anti- and syn-isomers.

Viewed from another aspect the invention provides a process for increasing the content of anti-isomer in a mixture of $C_1$-symmetric anti- and syn-bis cyclopentadienyl containing metallocene isomers, such as those of formulae 1a to 4a or of formulae 5 to 8 as hereinbefore defined;

wherein the process comprises adding said mixture to a liquid phase comprising at least one ether compound or at least one non-aromatic chlorinated compound at a temperature of from 0 to 200° C., preferably 0 to 150° C., more preferably 20 to 80° C., to form a solution of said mixture in the liquid phase or so as to form a slurry in which a portion of the mixture is in the form of solid particles in the liquid phase and a portion of the mixture dissolves in the ether or non-aromatic chlorinated compound;

and allowing the anti-isomer content of the mixture to increase by isomerisation in said liquid phase.

Cocatalyst

To form an active catalytic species it is normally necessary to employ a cocatalyst as is well known in the art.

According to the present invention a cocatalyst system comprising a boron containing cocatalyst and/or an aluminoxane cocatalyst is used in combination with the above defined metallocene catalyst complex.

The aluminoxane cocatalyst can be one of formula (X):

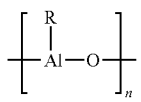

where n is usually from 6 to 20 and R has the meaning below.

Aluminoxanes are formed on partial hydrolysis of organoaluminum compounds, for example those of the formula $AlR_3$, $AlR_2Y$ and $Al_2R_3Y_3$ where R can be, for example, $C_1$-$C_{10}$ alkyl, preferably $C_1$-$C_5$ alkyl, or $C_{3-10}$ cycloalkyl, $C_7$-$C_{12}$ arylalkyl or alkylaryl and/or phenyl or naphthyl, and where Y can be hydrogen, halogen, preferably chlorine or bromine, or C1-C10 alkoxy, preferably methoxy or ethoxy. The resulting oxygen-containing aluminoxanes are not in general pure compounds but mixtures of oligomers of the formula (X).

The preferred aluminoxane is methylaluminoxane (MAO). Since the aluminoxanes used according to the invention as cocatalysts are not, owing to their mode of preparation, pure compounds, the molarity of aluminoxane solutions hereinafter is based on their aluminium content.

According to the present invention, also a boron containing cocatalyst can be used instead of the aluminoxane cocatalyst or the aluminoxane cocatalyst can be used in combination with a boron containing cocatalyst.

It will be appreciated by the skilled man that where boron based cocatalysts are employed, it is normal to pre-alkylate the complex by reaction thereof with an aluminium alkyl compound, such as TIBA. This procedure is well known and any suitable aluminium alkyl, e.g. $Al(C_{1-6}\text{-alkyl})_3$. can be used. Preferred aluminium alkyl compounds are triethylaluminium, tri-isobutylaluminium, tri-isohexylaluminium, tri-n-octylaluminium and tri-isooctylaluminium.

Alternatively, when a borate cocatalyst is used, the metallocene catalyst complex is in its alkylated version, that is for example a dimethyl or dibenzyl metallocene catalyst complex can be used.

Boron based cocatalysts of interest include those of formula (Z)

wherein Y is the same or different and is a hydrogen atom, an alkyl group of from 1 to about 20 carbon atoms, an aryl group of from 6 to about 15 carbon atoms, alkylaryl, arylalkyl, haloalkyl or haloaryl each having from 1 to 10 carbon atoms in the alkyl radical and from 6-20 carbon atoms in the aryl radical or fluorine, chlorine, bromine or iodine. Preferred examples for Y are trifluoromethyl, unsaturated groups such as haloaryl like p-fluorophenyl, 3,5-difluorophenyl, pentachlorophenyl, pentafluorophenyl, 3,4,5-trifluorophenyl and 3,5-di(trifluoromethyl)phenyl. Preferred options are trifluoroborane, tris(4-fluorophenyl)borane, tris(3,5-difluorophenyl)borane, tris(4-fluoromethylphenyl)borane, tris(2,4,6-trifluorophenyl)borane, tris(pentafluorophenyl)borane, tris(3,5-difluorophenyl)borane and/or tris (3,4,5-trifluorophenyl)borane.

Particular preference is given to tris(pentafluorophenyl) borane.

However it is preferred that borates are used, i.e. compounds containing a borate anion. Such ionic cocatalysts preferably contain a non-coordinating anion such as tetrakis (pentafluorophenyl)borate. Suitable counterions are protonated amine or aniline derivatives such as methylammonium, anilinium, dimethylammonium, diethylammonium, N-methylanilinium, diphenylammonium, N,N-dimethylanilinium, trimethylammonium, triethylammonium, tri-n-butylammonium, methyldiphenylammonium, pyridinium, p-bromo-N,N-dimethylanilinium or p-nitro-N,N-dimethylanilinium.

Preferred ionic compounds which can be used according to the present invention include:
tributylammoniumtetra(pentafluorophenyl)borate,
tributylammoniumtetra(trifluoromethylphenyl)borate,
tributylammoniumtetra(4-fluorophenyl)borate,
N,N-dimethylcyclohexylammoniumtetrakis(pentafluorophenyl)borate,
N,N-dimethylbenzylammoniumtetrakis(pentafluorophenyl)borate,
N,N-dimethylaniliniumtetrakis(pentafluorophenyl)borate,
N,N-di(propyl)ammoniumtetrakis(pentafluorophenyl)borate,
di(cyclohexyl)ammoniumtetrakist(pentafluorophenyl)borate,
triphenylphosphoniumtetrakis(pentafluorophenyl)borate,
triethylphosphoniumtetrakis(pentafluorophenyl)borate,
diphenylphosphoniumtetrakis(pentafluorophenyl)borate,
triphenylcarbeniumtetrakis(pentafluorophenyl)borate,
or ferroceniumtetrakis(pentafluorophenyl)borate.

Preference is given to triphenylcarbeniumtetrakis(pentafluorophenyl) borate, N,N-dimethylaniliniumtetrakis(pentafluorophenyl)borate, N,N-dimethylcyclohexylammoniumtetrakis(pentafluorophenyl)borate and N,N-dimethylbenzylammoniumtetrakis(pentafluorophenyl) borate.

In particular, triphenylcarbeniumtetrakis(pentafluorophenyl)borate and N,N-dimethylaniliniumtetrakis(pentafluorophenyl)borate are especially preferred.

Thus the use of $Ph_3CB(PhF_5)_4$ and analogues therefore are especially favoured.

According to the present invention, the preferred cocatalysts are alumoxanes, more preferably methylalumoxanes, combinations of alumoxanes with Al-alkyls, boron or borate cocatalysts and combination of alumoxanes with boron-based cocatalysts.

According to the most preferred embodiment of present invention, the preferred cocatalysts are alumoxanes, most preferably methylalumoxanes in combination with a borate cocatalyst such as N,N-dimethylammonium-tetrakispentafluorophenylborate and $Ph_3CB(PhF_5)_4$. The combination of methylalumoxane and a tritylborate is especially preferred.

Suitable amounts of cocatalyst will be well known to the skilled man.

The molar ratio of feed amounts of boron to the metal ion of the metallocene may be in the range 0.1:1 to 10:1 mol/mol, preferably 0.3:1 to 7:1, especially 0.3:1 to 5:1 mol/mol.

The molar ratio of Al in the aluminoxane to the metal ion of the metallocene may be in the range 1:1 to 2000:1 mol/mol, preferably 10:1 to 1000:1, and more preferably 50:1 to 500:1 mol/mol.

The catalyst may contain from 10 to 100 μmol of the metal ion of the metallocene per gram of silica, and 5 to 10 mmol of Al per gram of silica.

Catalyst Manufacture

The metallocene catalyst complex of the present invention can be used in combination with a suitable cocatalyst as a catalyst for the polymerization of propylene, e.g. in a solvent such as toluene or an aliphatic hydrocarbon, (i.e. for polymerization in solution), as it is well known in the art.

The catalyst of the invention can be used in supported or unsupported form. Preferably, the catalyst system of the invention is used in supported form. The particulate support material used is preferably an organic or inorganic material, such as silica, alumina or zirconia or a mixed oxide such as silica-alumina, in particular silica, alumina or silica-alumina. The use of a silica support is preferred. The skilled man is aware of the procedures required to support a metallocene catalyst. Especially preferably the support is a porous material so that the complex may be loaded into the pores of the support, e.g. using a process analogous to those described in WO94/14856, WO95/12622 and WO2006/097497.

The average particle size of the silica support can be typically from 10 to 100 μm. However, it has turned out that special advantages can be obtained if the support has an average particle size from 15 to 80 μm, preferably from 18 to 50 μm.

The average pore size of the silica support can be in the range 10 to 100 nm and the pore volume from 1 to 3 mL/g.

Examples of suitable support materials are, for instance, ES757 produced and marketed by PQ Corporation, Sylopol 948 produced and marketed by Grace or SUNSPERA DM-L-303 silica produced by AGC Si-Tech Co.

Supports can be optionally calcined prior to the use in catalyst preparation in order to reach optimal silanol group content.

The use of these supports is routine in the art.

In an alternative embodiment, no support is used at all. Such a catalyst can be prepared in solution, for example in an aromatic solvent like toluene, by contacting the metallocene (as a solid or as a solution) with the cocatalyst, for example methylaluminoxane or a borane or a borate salt previously dissolved in an aromatic solvent, or can be prepared by sequentially adding the dissolved catalyst components to the polymerization medium.

In one embodiment, no external carrier is used but the catalyst is still presented in solid particulate form. Thus, no external support material, such as inert organic or inorganic carrier, for example silica as described above is employed, but the solid catalyst is prepared using an emulsion-solidification method. Full disclosure of said method is described in WO2003/051934, which is herein incorporated by reference.

In one embodiment, the preparation of the catalyst system according to the present invention comprises the steps of:
  a') reacting a silica support with aluminoxane cocatalyst in a suitable hydrocarbon solvent, such as toluene with optional subsequent washings and drying, to obtain an aluminoxane cocatalyst treated support,
  b') reacting the metallocene complex of formula (I) with a borate cocatalyst and optionally an aluminoxane cocatalyst, in particular methylaluminoxane, in a suitable hydrocarbon solvent, such as toluene or xylene, to obtain a solution of activated metallocene complex of formula (I), borate cocatalyst and optionally aluminoxane cocatalyst, whereby the borate cocatalyst is added in an amount that a boron/hafnium molar ratio of feed amounts in the range of 0.1:1 to 10:1 is reached,
  c') adding the solution obtained in step b') to the aluminoxane cocatalyst treated support obtained in step a') wherein the amount of aluminoxane cocatalyst added in step a') is 75.0 to 100 wt % of the total amount of aluminoxane cocatalyst and the amount of aluminoxane cocatalyst added in step b') is 0 to 25.0 wt % of the total amount of aluminoxane cocatalyst and
  d') optionally drying the so obtained supported catalyst system.

In an alternative embodiment, the preparation of the catalyst system according to the present invention comprises the steps of:
  a) reacting a silica support with an aluminoxane cocatalyst in a suitable hydrocarbon solvent, such as toluene with optional subsequent washings and drying, to obtain aluminoxane cocatalyst treated support,
  b) reacting the metallocene complex of formula (I) with an aluminoxane cocatalyst in a suitable hydrocarbon solvent, such as toluene,
  c) adding borate cocatalyst to the solution obtained in step b) to obtain a solution of metallocene complex of formula (I), borate cocatalyst and aluminoxane cocatalyst whereby the borate cocatalyst is added in an amount that a boron/hafnium molar ratio of feed amounts in the range of 0.1:1 to 10:1 is reached,
  d) adding the solution obtained in step c) to the aluminoxane cocatalyst treated support obtained in step a) wherein the amount of aluminoxane cocatalyst added in step a) is 75.0 to 97.0 wt % of the total amount of aluminoxane cocatalyst and the amount of aluminoxane cocatalyst added in step b) is 3.0 to 25.0 wt % of the total amount of aluminoxane cocatalyst and e) optionally drying the so obtained supported catalyst system.

Polymerization

Whilst the catalysts according to the invention are suited to the formation of any polyolefin, such as a polypropylene homo- or copolymers, they are especially targeted towards the preparation of heterophasic propylene copolymers with ethylene and optionally with 1-butene.

Such polymers can be prepared in a multistage polymerization using conventional polymerization techniques, comprising at least two polymerization steps, e.g. slurry or bulk polymerization and a gas phase polymerization steps. Each step may comprises one or more polymerization reactors. Polymerization in the process of the invention preferably may be effected in in at least two or more, e.g. 2, 3 or 4, polymerization reactors of which at least one reactor is a gas phase reactor. Ideally, the multistage process of the invention employs a first reactor operating in liquid slurry and a second and optional third reactors being gas phase reactors. The process may also utilise a pre-polymerization step. Liquid slurry reactions may take place in a loop reactor. For the purpose of this invention, the slurry polymerization in liquid monomer is also referred to as the bulk step.

In case of propylene polymerization for slurry reactors, the reaction temperature will generally be in the range 60 to 110° C. (e.g. 60-90° C.), the reactor pressure will generally be in the range 5 to 80 bar (e.g. 20-60 bar), and the residence time will generally be in the range 0.1 to 5 hours (e.g. 0.3 to 2 hours). The monomer is usually used as reaction medium.

For gas phase reactors, the reaction temperature used will generally be in the range 60 to 115° C. (e.g. 70 to 110° C.), the reactor pressure will generally be in the range 10 to 25 bar, and the residence time will generally be 0.5 to 8 hours (e.g. 0.5 to 4 hours). The gas used will be the monomer optionally as mixture with a non-reactive gas such as nitrogen or propane.

In addition to actual polymerization steps and reactors, the process can contain any additional polymerization steps, like pre-polymerization step, and any further after reactor handling steps as known in the art.

Generally the quantity of catalyst used will depend upon the nature of the catalyst, the reactor types and conditions and the properties desired for the polymer product. As is well known in the art hydrogen can be used for controlling the molecular weight of the polymer.

The invention preferably relates to the copolymerisation of propylene and ethylene in at least a two step process so as to form a heterophasic propylene ethylene copolymer.

In heterophasic propylene copolymers, a homopolymer or random copolymer matrix (M) (produced in the first step) is combined with a copolymeric amorphous fraction, i.e. amorphous propylene-ethylene copolymer or propylene-ethylene-1-butene copolymer (A), (formed in the second step) to form the heterophasic copolymer of the invention.

According to the present invention the amorphous propylene-ethylene copolymer or amorphous propylene-ethylene-1-butene copolymer (A) is formed in a gas phase reactor. If a two reactor configuration (one bulk and one gas phase reactor), the copolymer (A) is formed in said gas phase reactor. For the purpose of this invention, the amorphous propylene-ethylene copolymer (A) is also referred to as ethylene-propylene rubber or EPR and the amorphous propylene-ethylene-1-butene copolymer (A) is referred to as ethylene-propylene-butene rubber or EPBR.

Where two gas phase reactors are employed, the first gas phase reactor may produce a homopolymer or copolymer component, ideally a homopolymer component, whereby this polymer component from such a first gas phase reactor forms part of the matrix (M) of the polymer. The propylene ethylene or propylene-ethylene-1-butene amorphous phase (A) is formed in the last gas phase step. Preferably the amorphous phase (A) is a propylene-ethylene copolymer.

Production splits between the various reactors can vary. When two reactors are used, splits are generally in the range of 95 to 5 wt % bulk to gas phase to 30 to 70 wt % bulk to gas phase. Where three reactors are used, it is preferred that each reactor preferably produces at least 5 wt % of the polymer.

The catalyst system of the present invention is especially beneficial to be used in the manufacture of heterophasic PP/EPR reactor blends.

Thus, viewed from this aspect the invention provides a process for the preparation of a heterophasic polypropylene copolymer comprising:

(I) polymerizing propylene and optionally ethylene and/or 1-butene in bulk in the presence of a catalyst system as herein defined to form a polypropylene homopolymer or polypropylene random copolymer matrix;

(II) in the presence said matrix and said catalyst system, polymerizing propylene and ethylene and optionally 1-butene in the gas phase to form a heterophasic polypropylene copolymer comprising a homopolymer or propylene random copolymer matrix and an propylene-ethylene rubber or propylene-ethylene-1-butene rubber.

Viewed from another aspect the invention provides a process for the preparation of a heterophasic polypropylene copolymer comprising:

(I) polymerizing propylene and optionally ethylene and/or 1-butene in bulk in the presence of a catalyst system as herein defined to form a polypropylene homopolymer or propylene random copolymer;

(II) in the presence of said homopolymer or propylene random copolymer and said catalyst system, polymerizing additional propylene and optionally ethylene and/or 1-butene in the gas phase to form a polypropylene homopolymer matrix or propylene random copolymer matrix;

(III) in the presence of said matrix and said catalyst system, polymerizing propylene and ethylene and optionally 1-butene in the gas phase to form a heterophasic polypropylene copolymer comprising a homopolymer or propylene random copolymer matrix and an propylene ethylene rubber or propylene-ethylene-1-butene propylene rubber (EPR).

According to one preferred embodiment of the invention the matrix is a propylene homopolymer. According to another preferred embodiment of the invention the matrix is a random polypropylene copolymer, where the amount of comonomer in the matrix is up to 2 wt %. Preferably the comonomer is ethylene.

Further, preferably the propylene rubber is a propylene-ethylene rubber.

According to a further aspect, the present invention comprises a process for the preparation of a heterophasic polypropylene copolymer comprising:

(I) polymerising propylene and optionally ethylene and/or 1-butene in a first step, comprising a bulk phase polymerization in the presence of a catalyst comprising:

(i) a metallocene of formula (5)

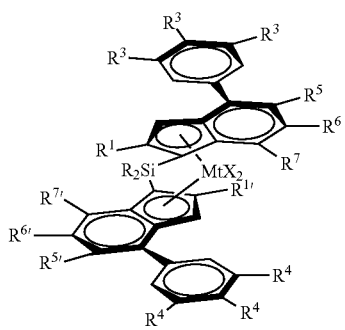

Formula 5 wherein Mt is Hf;
each X is a sigma-ligand;
the two R groups, which can be the same or can be different, are $C_{1-20}$ hydrocarbyl groups, optionally containing up to 2 silicon atoms or heteroatoms, and are preferably $C_{1-8}$ hydrocarbyl groups; most preferably one R is methyl, ethyl, n-propyl or i-propyl, and the other R is selected from methyl, ethyl, n-propyl, i-propyl, n-butyl, i-butyl, pentyl, hexyl, cyclohexyl and phenyl;
$R^1$ and $R^{1'}$ are the same or can be different;
$R^1$ is a $CH_2$—$R^2$ group, with $R^2$ being H or a linear or branched $C_{1-6}$-alkyl group, $C_{3-8}$ cycloalkyl group, $C_{6-10}$ aryl group;
$R^{1'}$ is a $C_{1-20}$ hydrocarbyl group; preferably, $R^1$ and $R^{1'}$ are the same and are linear or branched $C_{1-6}$-alkyl groups;
each $R^5$ and $R^6$ are independently hydrogen or a $C_{1-20}$ hydrocarbyl group, optionally containing up to 2 silicon atoms or heteroatoms, or taken together are —CH=, —CY=, —CH$_2$—, —CHY— or —OY$_2$— groups that are part of a cyclic structure of 4 to 7 atoms, including the carbon atoms at positions 5 and 6 of the corresponding indenyl ligand, wherein Y is a $C_{1-10}$ hydrocarbyl group;
each $R^3$ and $R^4$ are independently the same or can be different and are hydrogen, a linear or branched $C_1$-$C_6$-alkyl group, an OY group or a $C_{7-20}$ arylalkyl, $C_{7-20}$ alkylaryl group or $C_{6-20}$ aryl group, and optionally two adjacent $R^3$ or $R^4$ groups can be part of a ring including the phenyl carbons to which they are bonded;
$R^{5'}$ is hydrogen or a linear, branched or cyclic $C_1$-$C_6$-alkyl group, $C_{7-20}$ arylalkyl, $C_{7-20}$ alkylaryl group or $C_6$-$C_{20}$-aryl group, or an OY group;
$R^{6'}$ is hydrogen or a linear, branched or cyclic $C_1$-$C_6$-alkyl group, $C_{7-20}$ arylalkyl, $C_{7-20}$ alkylaryl group or $C_6$-$C_{20}$-aryl group, or an OY group;
with the proviso that when $R^{5'}$ is an OY group, then $R^{6'}$ is a $C(R^8)_3$ group, with $R^8$ being a linear or branched $C_1$-$C_6$ alkyl group;
$R^{7'}$ is a $C_{1-20}$ hydrocarbyl group optionally containing up to two silicon atoms or heteroatoms;
$R^{7'}$ is hydrogen or a $C_{1-3}$ hydrocarbyl group or an OY group;
and with the proviso that $R^{6'}$ can be hydrogen only when $R^{7'}$ is different from hydrogen;
(ii) a cocatalyst comprising a compound of a group 13 element;
to produce a polypropylene homopolymer or propylene random copolymer matrix having a comonomer content of 2 wt % or less; and subsequently in the presence of said matrix and said catalyst system;

(II) polymerising propylene and ethylene and optionally-1-butene in the gas phase in the presence of said catalyst to form a propylene ethylene or propylene ethylene 1-butene copolymer component;
wherein said heterophasic polypropylene copolymer has an IV(SF) of 1.5 to 10 dl/g, preferably 2 to 9 dl/g, more preferably 4.5 to 9.0 dl/g, most preferably 5.5 to 8.0 dl/g,
a comonomer content, preferably ethylene content, (SF) of 12 to 85 wt %, preferably 15 to 70 wt %, wherein the amount of crystalline fraction (CF) and the amount of soluble fraction (SF) are determined in 1,2,4-trichlorobenzene at 40° C.

According to a preferred embodiment the present invention comprises a process for the preparation of a heterophasic polypropylene copolymer wherein the metallocene (i) is of formula (6) or more preferably of formula (7) as defined above.

According to another embodiment of the present invention the first step comprises in addition to the bulk phase polymerization step a gas phase polymerisation step as herein described.

The comonomer is preferably ethylene.

Polymers

It is a feature of the invention that the claimed catalysts enable the formation of certain heterophasic propylene copolymers. Viewed from another aspect the invention enables the formation of a heterophasic polypropylene copolymer having an MFR2 of 0.05 to 100 g/10 min and wherein the heterophasic polypropylene copolymer is characterized by
(a1) 30.0 to 95.0 wt % of a crystalline fraction (CF); and
(a2) 5.0 to 70.0 wt % of a soluble fraction (SF) having a comonomer content, such as ethylene content, of 12 to 85 wt %, preferably 15.0 to 70.0 wt %; and
wherein the intrinsic viscosity (IV) (in decalin at 135° C.) of the soluble fraction (SF) is 1.5 to 10 dl/g, preferably 2 to 9, more preferably 4.5 to 9 dl/g, most preferably 5.5 to 8 dl/g, wherein the amount of crystalline fraction (CF) and the amount of soluble fraction (SF) are determined in 1,2,4-trichlorobenzene at 40° C.

Viewed from another aspect the invention enables the formation of a heterophasic polypropylene copolymer having an MFR2 of 0.05 to 100 g/10 min and a melting point (Tm) of 156 to 162° C. and comprising:
(a1) 30.0 to 95.0 wt % of a crystalline fraction (CF) and
(a2) 5.0 to 70.0 wt % of a soluble fraction (SF) having a comonomer content, such as ethylene content, of 12 to 85 wt %, preferably 15.0 to 70.0 wt %; and wherein the intrinsic viscosity (IV) (in decalin at 135° C.) of the soluble fraction (SF) is 1.5 to 10 dl/g, preferably 2 to 9 dl/g, more preferably 4.5 to 9.0 dl/g, most preferably 5.5 to 8 dl/g, wherein the amount of crystalline fraction (CF) and the amount of soluble fraction (SF) are determined in 1,2,4-trichlorobenzene at 40° C.

Viewed from another aspect the invention enables the formation of a heterophasic polypropylene copolymer having an MFR2 of 0.05 to 100 g/10 min and a melting point $T_m$ is ≥158° C. comprising:
(a1) 30.0 to 95.0 wt % of a crystalline fraction (CF) and
(a2) 5.0 to 70.0 wt % of a soluble fraction (SF) having an ethylene content of 12 to 85 wt %, preferably 15.0 to 70.0 wt %; and wherein the intrinsic viscosity (IV) (in decalin at 135° C.) of the soluble fraction (i.e. that fraction soluble in 1,2,4-trichlorobenzene at 40° C.) is >5 dl/g.

Through the use of catalysts of the invention, the nature of the rubber component can be tailored to achieve surprisingly high molecular weight. Also, we show that the heterophasic copolymers of the invention possess a very high melting point (Tm) of 156 to 162° C., preferably 157 to 162° C., still more preferably 158 to 162° C.

Such heterophasic propylene copolymers (HECOs) comprise a semicrystalline polymer matrix (M) being a propylene homopolymer (hPP) or a semicrystalline random propylene-ethylene or propylene-ethylene-1-butene copolymer (rPP) or a combination of the two, in which a mostly amorphous copolymer (A), like a propylene-ethylene copolymer (EP), is dispersed (rubber phase, such as EPR).

Thus, the polypropylene matrix (M) contains (finely) dispersed inclusions being not part of the matrix and said inclusions contain the amorphous copolymer (A).

The term "heterophasic polypropylene copolymer" used herein denotes copolymers comprising a matrix resin, being a polypropylene homopolymer or a propylene copolymer and a predominantly amorphous copolymer (A) dispersed in said matrix resin, as defined in more detail below.

In the present invention, the term "matrix" is to be interpreted in its commonly accepted meaning, i.e. it refers to a continuous phase (in the present invention a continuous polymer phase) in which isolated or discrete particles such as rubber particles may be dispersed. The propylene polymer is present in such an amount that it forms a continuous phase which can act as a matrix.

Furthermore the terms "amorphous copolymer", "dispersed phase", "predominantly amorphous copolymer" and "rubber phase" denote the same, i.e. are interchangeable in the present invention. Amorphous means that the copolymer, when analysed by DSC as a pure component (after having been extracted from the matrix by xylene extraction), has a heat of fusion of less than 20 J/g.

Matrix (M)

The matrix (M) of the heterophasic polypropylene copolymer is preferably a propylene homopolymer or a semicrystalline propylene-ethylene or propylene-butene copolymer or a propylene-ethylene butene copolymer or a combination thereof. The term "semicrystalline" indicates that the copolymer has a well-defined melting point and a heat of fusion higher than 50 J/g.

The expression homopolymer used in the instant invention relates to a polypropylene that consists substantially of propylene units. In a preferred embodiment, only propylene units in the propylene homopolymer are detectable.

In one embodiment the matrix (M) comprises the homopolymer of propylene as defined above or below, preferably consists of the homopolymer of propylene as defined above or below.

The polypropylene homopolymer may comprise or consist of a single polypropylene homopolymer fraction (=unimodal), but may also comprise a mixture of different polypropylene homopolymer fractions.

In cases where the polypropylene homopolymer comprises different fractions, the polypropylene homopolymer is understood to be bi- or multimodal. These fractions may have different average molecular weight or different molecular weight distribution.

It is preferred that the polypropylene homopolymer can be bimodal or multimodal in view of molecular weight or molecular weight distribution.

It is alternatively preferred that the polypropylene homopolymer can be unimodal in view of average molecular weight and/or molecular weight distribution.

Thus in one embodiment or the present invention the matrix (M) is unimodal, whereas in another embodiment the matrix (M) is bimodal and consists of two propylene homopolymer fractions (hPP-1) and (hPP-2)

In a further embodiment, the matrix (M) is bimodal and consists of one homopolymer fraction and one semicrystalline copolymer fraction.

Amorphous Propylene Copolymer (A))

The second component of the particular heterophasic polypropylene copolymer is the propylene copolymer (A), which is an amorphous copolymer of propylene and ethylene. Thus, the second component an elastomeric copolymer, being dispersed in said matrix (M) (i.e. dispersed phase).

As stated above, the terms "amorphous (propylene-ethylene) copolymer", "dispersed phase" and "rubber phase" denote the same, i.e. are interchangeable in view of this invention.

The amorphous propylene-ethylene copolymer (A) is fully soluble in xylene at room temperature. The amorphous propylene copolymer may also be amorphous propylene-ethylene-1-butene copolymer.

Like the propylene polymer matrix, the dispersed phase can be unimodal or multimodal, like bimodal.

In one embodiment, the dispersed phase is unimodal. More particularly, the dispersed phase is preferably unimodal with respect to the intrinsic viscosity and/or the comonomer distribution.

Concerning the definition of unimodal and multimodal, like bimodal, it is referred to the definition above.

Preferably, the unimodal dispersed phase is made in one reaction stage, more preferably in a gas phase reactor and comprises, such as consists of, one propylene-ethylene copolymer fraction.

Final Heterophasic Propylene Copolymer

The heterophasic propylene copolymer according to the present invention is, as described above, produced by sequential polymerization. Preferably, in at least one step the propylene homopolymer matrix is produced, and in a subsequent step the amorphous propylene-ethylene copolymer (A) is produced in the presence of the propylene homopolymer.

In order to characterize the matrix phase and the amorphous phase of a heterophasic propylene copolymer several methods are known.

The crystalline fraction and a soluble fraction may be separated with the CRYSTEX QC method using 1,2,4-trichlorobenzene (TCB) as solvent. This method is described below in the measurement methods section. In this method, a crystalline fraction (CF) and a soluble fraction (SF) are separated from each other. The crystalline fraction (CF) largely corresponds to the matrix phase and contains only a small part of the elastomeric phase, while the soluble fraction (SF) largely corresponds to the elastomeric phase and contains only a small part of the matrix phase.

It is preferred if the matrix phase is at least partially crystalline thus ensuring that the polymer as a whole comprises a crystalline phase and an amorphous phase.

The matrix component is ideally an isotactic polypropylene matrix component. The matrix component may consist of a single propylene homopolymer but may also comprise a mixture of different propylene homopolymers. Ideally, however a single propylene homopolymer is present.

The matrix component may have a melting point (Tm) of 156 to 162° C., preferably 158 to 161° C.

It is preferred if the heterophasic propylene copolymer has a melting point (Tm) of 156 to 162° C., preferably 157 to 161° C., especially 158 to 161° C.

It is preferred if the heterophasic propylene copolymer has an MFR2 of 0.1 to 10 g/10 min, such as 0.1 to 5.0 g/10 min.

It is preferred if the heterophasic propylene copolymer has a xylene soluble fraction of 5.0 to 30 wt %.

It is preferred if the heterophasic propylene copolymer comprises 50.0 to 95.0 wt % of a crystalline fraction (CF), especially 70.0 to 95.0 wt %.

It is preferred if the heterophasic propylene copolymer comprises 5.0 to 50.0 wt % of a soluble fraction (SF), especially 5.0 to 30.0 wt % soluble fraction.

It is preferred if the soluble fraction has an ethylene content of 18.0 to 55.0 wt %, preferably 20.0 to 50.0 wt %.

It is preferred if the heterophasic propylene copolymer has an Mw/Mn of 1.0 to 4.0.

Applications

The heterophasic polypropylene resin of the invention can be used in the manufacture of an article such as a flexible pipe/tube, profile, cable insulation, sheet or film. These articles are useful in the medical and general packaging area but also for technical purposes like electrical power cables or geomembranes. Alternatively, the heterophasic polypropylene resin can be used in impact modification of a composition for injection moulding of articles, such as for technical applications in the automotive area.

For impact modification, the inventive heterophasic polypropylene resin may be blended to another polypropylene resin. Thus, the invention also relates to polymer blends comprising the heterophasic polypropylene resins of the invention.

The polymers of the invention are useful in the manufacture of a variety of end articles such as films (cast, blown or BOPP films), moulded articles (e.g. injection moulded, blow moulded, rotomoulded articles), extrusion coatings and so on. Preferably, articles comprising the films of the invention are used in packaging. Packaging of interest include heavy duty sacks, hygiene films, lamination films, and soft packaging films.

The invention will now be illustrated by reference to the following non-limiting examples.

Analytical Tests

Measurement Methods

Al, Zr and Hf Determination (ICP-Method)

In a glovebox, an aliquot of the catalyst (ca. 40 mg) was weighed into glass weighting boat using analytical balance. The sample was then allowed to be exposed to air overnight while being placed in a steel secondary container equipped with an air intake. Then 5 mL of concentrated (65%) nitric acid was used to rinse the content of the boat into the Xpress microwave oven vessel (20 mL). A sample was then subjected to a microwave-assisted digestion using MARS 6 laboratory microwave unit over 35 minutes at 150° C. The digested sample was allowed to cool down for at least 4 h and then was transferred into a glass volumetric glass flask of 100 mL volume. Standard solutions containing 1000 mg/L Y and Rh (0.4 mL) were added. The flask was then filled up with distilled water and shaken well. The solution was filtered through 0.45 µm Nylon syringe filters and then subjected to analysis using Thermo iCAP 6300 ICP-OES and iTEVA software.

The instrument was calibrated for Al, B, Hf, Mg, Ti and Zr using a blank (a solution of 5% HNO$_3$) and six standards of 0.005 mg/L, 0.01 mg/L, 0.1 mg/L, 1 mg/L, 10 mg/L and 100 mg/L of Al, B, Hf, Mg, Ti and Zr in solutions of 5% HNO$_3$ distilled water. However, not every calibration point was used for each wavelength. Each calibration solution contained 4 mg/L of Y and Rh standards. Al 394.401 nm was calibrated using the following calibration points: blank, 0.1 mg/L, 1 mg/L, 10 mg/L and 100 mg/L. Al 167.079 nm was calibrated as Al 394.401 nm excluding 100 mg/L and Zr 339.198 nm using the standards of blank, 0.01 mg/L, 0.1 mg/L, 1 mg/L, 10 mg/L and 100 mg/L. Curvilinear fitting and 1/concentration weighting was used for the calibration curves. Hf 264.141 nm was calibrated using the standards of blank, 0.01 mg/L, 0.1 mg/L, 1 mg/L, 10 mg/L and 100 mg/L.

Immediately before analysis the calibration was verified and adjusted (instrument reslope function) using the blank and a 10 mg/L Al, B, Hf, Mg, Ti and Zr standard which had 4 mg/L Y and Rh. A quality control sample (QC: 1 mg/L Al, Au, Be, Hg & Se; 2 mg/L Hf & Zr, 2.5 mg/L As, B, Cd, Co, Cr, Mo, Ni, P, Sb, Sn & V; 4 mg/L Rh & Y; 5 mg/L Ca, K, Mg, Mn, Na & Ti; 10 mg/L Cu, Pb and Zn; 25 mg/L Fe and 37.5 mg/L Ca in a solution of 5% HNO3 in distilled water) was run to confirm the reslope for Al, B, Hf, Mg, Ti and Zr. The QC sample was also run at the end of a scheduled analysis set.

The content for Zr was monitored using Zr 339.198 nm {99} line. Content of Hf was monitored using line Hf 264.141 nm {128}. The content of aluminium was monitored via the 167.079 nm {502} line, when Al concentration in test portion was under 2 wt % and via the 394.401 nm {85} line for Al concentrations above 2 wt %. Y 371.030 nm {91} was used as internal standard for Zr 339.198 nm and Al 394.401 nm and Y 224.306 nm {450} for Al 167.079 nm.

The reported values were back calculated to the original catalyst sample using the original mass of the catalyst aliquot and the dilution volume.

GPC: Molecular Weight Averages, Molecular Weight Distribution, and Polydispersity Index (Mn, Mw, Mw/Mn)

Molecular weight averages (Mw and Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-1: 2003, ISO 16014-2:2003, ISO 16014-4:2003 and ASTM D 6474-12.

A high temperature GPC instrument, equipped with either infrared (IR) detector (IR4 or IR5 from PolymerChar (Valencia, Spain) or differential refractometer (RI) from Agilent Technologies, equipped with 3× Agilent-PLgel Olexis and 1× Agilent-PLgel Olexis Guard columns was used. As the solvent and mobile phase 1,2,4-trichlorobenzene (TCB) stabilized with 250 mg/L 2,6-Di tert butyl-4-methyl-phenol) was used. The chromatographic system was operated at 160° C. and at a constant flow rate of 1 mL/min. 200 µL of sample solution was injected per analysis. Data collection was performed using either Agilent Cirrus software version 3.3 or PolymerChar GPC-IR control software.

The column set was calibrated using universal calibration (according to ISO 16014-2:2003) with 19 narrow MWD polystyrene (PS) standards in the range of 0.5 kg/mol to 11 500 kg/mol. The PS standards were dissolved at room temperature over several hours. The conversion of the polystyrene peak molecular weight to polyolefin molecular weights is accomplished by using the Mark Houwink equation and the following Mark Houwink constants:

$K_{PS}=19\times10^{-3}$ mL/g, $\alpha_{PS}=0.655$ $K_{PE}=39\times10^{-3}$ mL/g, $\alpha_{PE}=0.725$ $K_{PP}=19\times10^{-3}$ mL/g, $\alpha_{PP}=0.725$ A third order polynomial fit was used to fit the calibration data.

All samples were prepared in the concentration range of 0.5-1 mg/ml and dissolved at 160° C. for 2.5 hours for PP or 3 hour.

DSC Analysis

DSC analysis was measured with a Mettler TA Instrument Q2000 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature (Tc) is determined from the cooling step, while main melting temperature (Tm) and heat of melting ($H_m$) are determined from the second heating step.

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 230° C. with a loading of 2.16 kg (MFR2)

Determination of Xylene Soluble Fraction (XS)

The xylene soluble fraction (XS) as defined and described in the present invention is determined in line with ISO 16152 as follows: 2.0 g of the polymer were dissolved in 250 ml p-xylene at 135° C. under agitation. After 30 minutes, the solution was allowed to cool for 15 minutes at ambient temperature and then allowed to settle for 30 minutes at 25±0.5° C. The solution was filtered with filter paper into two 100 ml flasks. The solution from the first 100 ml vessel was evaporated in nitrogen flow and the residue dried under vacuum at 90° C. until constant weight is reached. The xylene soluble fraction (wt-percent) can then be determined as follows:

$$XS \text{ wt }\%=(100 \times m1 \times v0)/(m0 \times v1),$$

wherein m0 designates the initial polymer amount (grams), m1 defines the weight of residue (grams), v0 defines the initial volume (milliliter) and v1 defines the volume of the analysed sample (milliliter).

CRYSTEX

Crystalline and Soluble Fractions and their Respective Properties

The crystalline (CF) and soluble fractions (SF) of the polypropylene (PP) compositions as well as the comonomer content and intrinsic viscosities of the respective fractions were analyzed by the CRYSTEX QC Polymer Char (Valencia, Spain).

A schematic representation of the CRYSTEX QC instrument is presented in Del Hierro, P.; Ortin, A.; Monrabal, B.; 'Soluble Fraction Analysis in polypropylene, The Column, February 2014. Pages 18-23. The crystalline and amorphous fractions are separated through temperature cycles of dissolution at 160° C., crystallization at 40° C. and re-dissolution in 1,2,4-trichlorobenzene (1,2,4-TCB) at 160° C. Quantification of SF and CF and determination of ethylene content (C2) are achieved by means of an infrared detector (IR4) and an online 2-capillary viscometer is used for determination of the intrinsic viscosity (IV).

IR4 detector is multiple wavelength detector detecting IR absorbance at two different bands ($CH_3$ and $CH_2$) for the determination of the concentration determination and the Ethylene content in Ethylene-Propylene copolymers. IR4 detector is calibrated with series of EP copolymers with known Ethylene content in the range of 2 wt % to 69 wt % (determined by 13C-NMR).

Amount of Soluble fraction (SF) and Crystalline Fraction (CF) are correlated through the XS calibration to the "Xylene Cold Soluble" (XCS) quantity and respectively Xylene Cold Insoluble (XCI) fractions, determined according to standard gravimetric method as per ISO16152. XS calibration is achieved by testing various EP copolymers with XS content in the range 2-31 wt %.

Intrinsic viscosity (IV) of the parent EP copolymer and its soluble and crystalline fractions are determined with a use of an online 2-capillary viscometer and are correlated to corresponding IV's determined in decalin according to ISO 1628.

Calibration is achieved with several commercial EP PP copolymers with IV=2-4 dL/g.

A sample of the PP composition to be analyzed is weighed out in concentrations of 10 mg/ml to 20 mg/ml. After automated filling of the vial with 1,2,4-TCB containing 250 mg/l 2,6-tert-butyl-4-methylphenol (BHT) as antioxidant, the sample is dissolved at 160° C. until complete dissolution is achieved, usually for 60 min, with constant stirring of 800 rpm.

A defined volume of the sample solution is injected into the column filled with inert support where the crystallization of the sample and separation of the soluble fraction from the crystalline part is taking place. This process is repeated two times. During the first injection the whole sample is measured at high temperature, determining the IV[dl/g] and the C2 [wt %] of the PP composition. During the second injection the soluble fraction (at low temperature) and the crystalline fraction (at high temperature) with the crystallization cycle are determined (wt % SF, wt % C2, IV).

EXAMPLES

Metallocene Synthesis

Chemicals Used for Complex Preparation 2,6-Dimethylaniline (Acros), 1-bromo-3,5-dimethylbenzene (Acros), 1-bromo-3,5-di-tert-butylbenzene (Acros), bis (2,6-diisopropylphenyl)imidazolium chloride (Aldrich), triphenylphosphine (Acros), NiCl2(DME) (Aldrich), dichlorodimethylsilane (Merck), ZrCl4 (Merck), trimethylborate (Acros), Pd(OAc)2 (Aldrich), NaBH4 (Acros), 2.5 M nBuLi in hexanes (Chemetal), CuCN (Merck), magnesium turnings (Acros), silica gel 60, 40-63 μm (Merck), bromine (Merck), 96% sulfuric acid (Reachim), sodium nitrite (Merck), copper powder (Alfa), potassium hydroxide (Merck), K2CO3 (Merck), 12 M HCl (Reachim), TsOH (Aldrich), MgSO4 (Merck), Na2CO3 (Merck), Na2SO4 (Akzo Nobel), methanol (Merck), diethyl ether (Merck), 1,2-dimethoxyethane (DME, Aldrich), 95% ethanol (Merck), dichloromethane (Merck), hexane (Merck), THF (Merck), and toluene (Merck) were used as received. Hexane, toluene and dichloromethane for organometallic synthesis were dried over molecular sieves 4A (Merck). Diethyl ether, THF, and 1,2-dimethoxyethane for organometallic synthesis were distilled over sodium benzophenonketyl. CDCl3 (Deutero GmbH) and CD2Cl2 (Deutero GmbH) were dried over molecular sieves 4A. 4,8-dibromo-1-methoxy-2-methyl-1,2,3,5,6,7-hexahydro-s-indacene and 5-tert-butyl-7-(3,5-di-tert-butylphenyl)-6-methoxy-2-methyl-1H-indene were obtained as described in WO2015/158790.

Synthesis of MC1 (Inventive Metallocene)

4,8-Di(3,5-dimethylphenyl)-6-methyl-1,2,3,5-tetrahydro-s-indacene

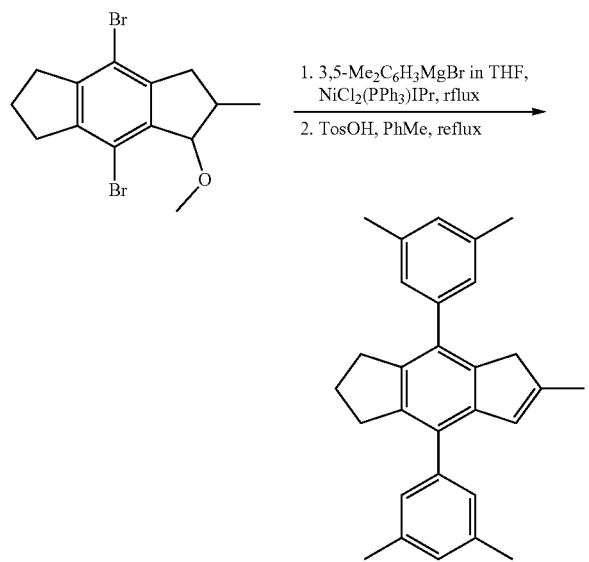

To a mixture of 2.0 g (2.56 mmol) of NiCl$_2$(PPh$_3$)IPr and 36.3 g (100.8 mmol) of 4,8-dibromo-1-methoxy-2-methyl-1,2,3,5,6,7-hexahydro-s-indacene 500 ml (250 mmol, 2.5 equiv) of 0.5 M 3,5-dimethylphenylmagnesium bromide in THF was added at a such rate to maintain a gentle reflux (for ca. 15 min). The resulting solution was refluxed additionally for 1 h, then cooled to room temperature, and 1200 ml of 0.5 M HCl and 500 ml of dichloromethane were added. The organic layer was separated, dried over K$_2$OC$_3$, passed through a short pad of silica gel 60 (40-63 μm, ca. 30 ml) and then evaporated to dryness to give the crude mixture of the diastereoisomers of 4,8-di(3,5-dimethylphenyl)-1-methoxy-2-methyl-1,2,3,5,6,7-hexahydro-s-indacene as a brownish oil. Further on, 315 mg of TsOH was added to a solution of the crude product in 420 ml of toluene, and the resulting mixture was refluxed using Dean-Stark head for 10 min. Then, one more portion of 220 mg of TsOH was added, and the obtained mixture was refluxed for 10 min. Finally, the last operation was repeated with 50 mg of TsOH. After cooling to room temperature the reaction mixture was washed with 200 ml of 10% K$_2$OC$_3$. The organic layer was separated, and the aqueous layer was additionally extracted with 200 ml of dichloromethane. The combined organic extract was dried over anhydrous K$_2$OC$_3$ (the organic layer became crimson at this stage), passed through a short pad of silica gel 60 (40-63 μm, 30 ml), and the resulting light-yellow solution was evaporated to ca. 30 ml to give a solution with a significant amount of a white precipitate. To this mixture 300 ml of n-hexane was added. The precipitated solid was filtered off (G3), washed with n-hexane, and dried in vacuum. This procedure gave 29.33 g (77.48 mmol, 76.9%) of 4,8-di(3,5-dimethylphenyl)-6-methyl-1,2,3,5-tetrahydro-s-indacene as a white fine-crystalline solid. The mother liquor was evaporated to dryness to give a yellowish solid mass. This mass was triturated with 40 ml of warm n-hexane, cooled to room temperature, and filtered off (G3). The obtained solid was washed with n-hexane and dried in vacuum. This procedure gave additionally 4.55 g (12.02 mmol, 11.9%) of 4,8-di(3,5-dimethylphenyl)-6-methyl-1,2,3,5-tetrahydro-s-indacene as a white powder. Thus, the total yield of the title product was 33.88 g (89.5 mmol, 88.8%).

$^1$H NMR (CDCl$_3$): δ 7.04 (s, 2H), 7.03 (s, 2H), 6.98 (s, 2H), 6.43 (m, 1H), 3.23 (s, 2H), 2.89 (t, J=7.3 Hz, 2H), 2.83 (t, J=7.3 Hz, 2H), 2.38 (s, 6H), 2.37 (s, 6H), 2.04 (s, 3H), 1.99 (quint, J=7.3 Hz, 2H). $^{13}$C{$^1$H} NMR (CDCl$_3$): δ 145.38, 142.84, 140.85, 140.43, 140.21, 139.80, 138.37, 137.55, 137.39, 133.44, 129.64, 128.39, 128.19, 127.31, 126.61, 126.34, 42.49, 32.76, 32.51, 26.08, 21.43, 16.81

[4,8-Bis(3,5-dimethylphenyl)-2-methyl-1,5,6,7-tetrahydro-s-indacen-1-yl] chlorodimethylsilane

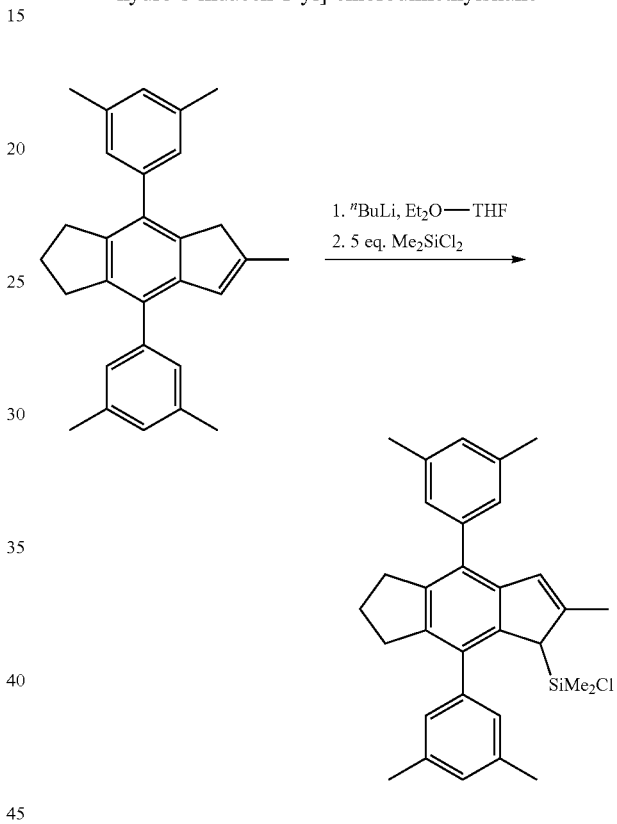

To a suspension of 11.96 g (31.59 mmol) of 4,8-di(3,5-dimethylphenyl)-6-methyl-1,2,3,5-tetrahydro-s-indacene in a mixture of 250 ml of ether and 40 ml of THF, cooled to −30° C., 13.0 ml (31.59 mmol) of 2.43 M $^n$BuLi in hexanes was added in one portion. The resulting mixture was stirred overnight at room temperature, then thus obtained light-orange solution with a large amount of orange precipitate was cooled to −50° C., and 19.0 ml (20.33 g, 157.5 mmol, 4.99 eqv.) of dichlorodimethylsilane was added in one portion. This mixture was stirred overnight at room temperature and then filtered through a glass frit (G3), the flask and filter cake were rinsed with 50 ml of toluene. The filtrate was evaporated to dryness to give 14.9 g (~100%) of the title compound as a white solid mass which was further used without an additional purification.

$^1$H NMR (CDCl$_3$): δ 7.09 (s, 2H), 7.02-6.94 (m, 4H), 6.51 (m, 1H), 4.07 (s, 1H), 3.26-3.14 (m, 1H), 2.95-2.79 (m, 2H), 2.60 (ddd, J=12.4 Hz, J=8.4 Hz, J=4.1 Hz, 1H), 2.38 and 2.37 (2 s, sum 12H), 2.24 (s, 3H), 2.12-1.99 (m, 1H), 1.95-1.80 (m, 1H), −0.16 (s, 3H), −0.20 (s, 3H). $^{13}$C{$^1$H} NMR (CDCl$_3$): δ 146.19, 143.17, 140.68, 140.29, 139.94, 139.92, 138.37, 137.59, 137.42, 132.60, 129.86, 128.52, 128.24, 127.85, 127.28, 126.32, 49.67, 33.33, 32.73, 26.15, 21.45, 21.42, 18.10, 3.92, −1.45.

[4,8-Bis(3,5-dimethylphenyl)-2-methyl-1,5,6,7-tetrahydro-s-indacen-1-yl][6-tert-butyl-4-(3,5-dimethylphenyl)-5-methoxy-2-methyl-1H-inden-1-yl]dimethylsilane

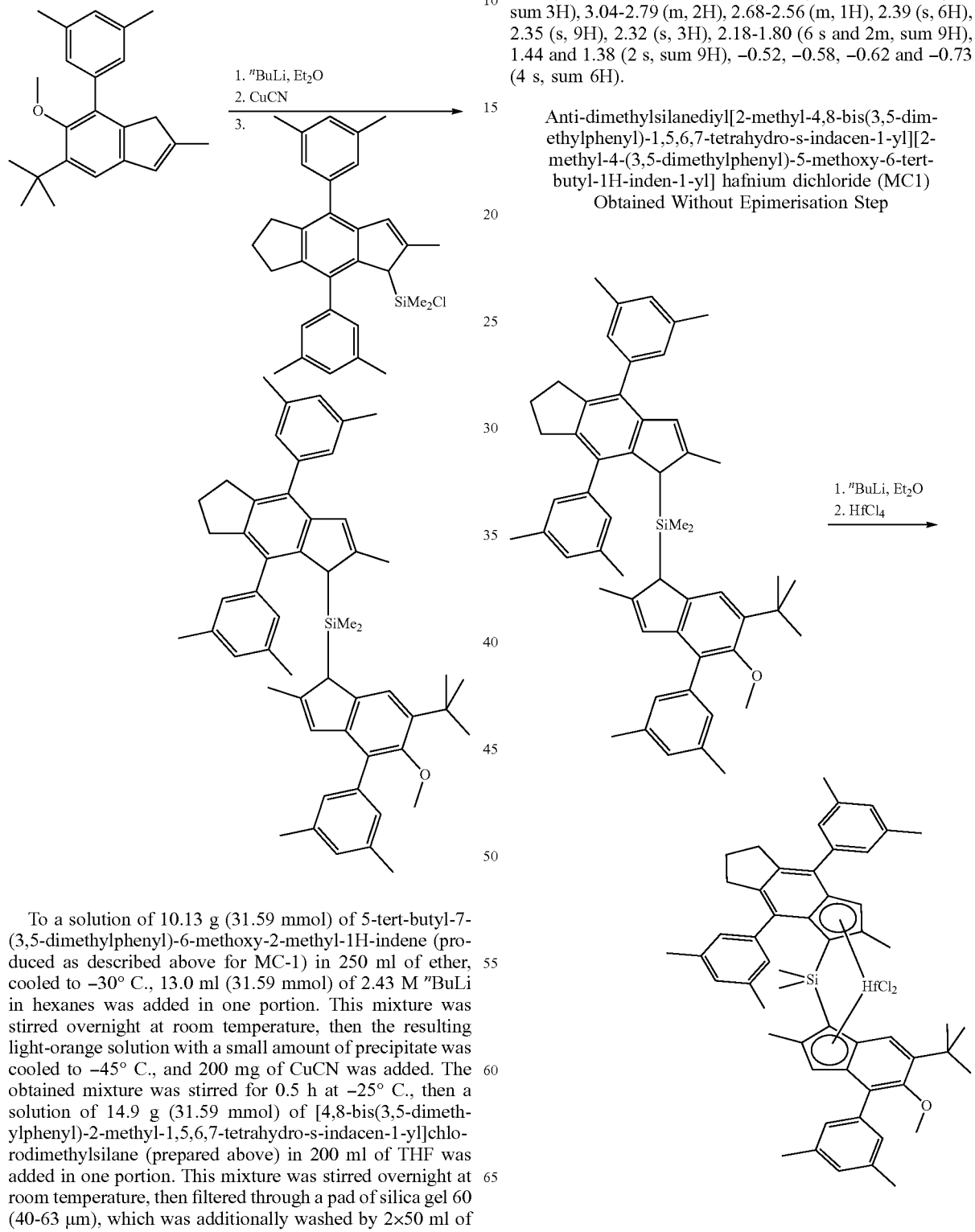

To a solution of 10.13 g (31.59 mmol) of 5-tert-butyl-7-(3,5-dimethylphenyl)-6-methoxy-2-methyl-1H-indene (produced as described above for MC-1) in 250 ml of ether, cooled to −30° C., 13.0 ml (31.59 mmol) of 2.43 M $^n$BuLi in hexanes was added in one portion. This mixture was stirred overnight at room temperature, then the resulting light-orange solution with a small amount of precipitate was cooled to −45° C., and 200 mg of CuCN was added. The obtained mixture was stirred for 0.5 h at −25° C., then a solution of 14.9 g (31.59 mmol) of [4,8-bis(3,5-dimethylphenyl)-2-methyl-1,5,6,7-tetrahydro-s-indacen-1-yl]chlorodimethylsilane (prepared above) in 200 ml of THF was added in one portion. This mixture was stirred overnight at room temperature, then filtered through a pad of silica gel 60 (40-63 μm), which was additionally washed by 2×50 ml of dichloromethane. The combined organic elute was evaporated to dryness, and the residue was dried in vacuum at elevated temperature to give 24.0 g (ca. 100% of ca. 90% purity) of the title product (ca. 55:45 mixture of the stereoisomers) as a slightly yellowish solid foam which was further used without an additional purification.

$^1$H NMR (CDCl$_3$): δ 7.27 and 7.25 (2 s, sum 2H), 7.04 (s, 4H), 6.98, 6.95 and 6.93 (3s, sum 3H), 6.90 and 6.85 (2 s, sum 1H), 6.46 (s, 1H), 6.23 and 6.20 (2 s, sum 1H), 4.41 and 4.16 (2 s, sum 1H), 3.30-2.62 (m, 1H), 3.22 and 3.20 (2 s, sum 3H), 3.04-2.79 (m, 2H), 2.68-2.56 (m, 1H), 2.39 (s, 6H), 2.35 (s, 9H), 2.32 (s, 3H), 2.18-1.80 (6 s and 2m, sum 9H), 1.44 and 1.38 (2 s, sum 9H), −0.52, −0.58, −0.62 and −0.73 (4 s, sum 6H).

Anti-dimethylsilanediyl[2-methyl-4,8-bis(3,5-dimethylphenyl)-1,5,6,7-tetrahydro-s-indacen-1-yl][2-methyl-4-(3,5-dimethylphenyl)-5-methoxy-6-tert-butyl-1H-inden-1-yl] hafnium dichloride (MC1) Obtained Without Epimerisation Step "BuLi in hexanes (2.43 M, 24.8 ml, 60.26 mmol) was added in one portion to a yellowish solution of [2-methyl-4,8-bis(3,5-dimethylphenyl)-1,5,6,7-tetrahydro-s-indacen-1-yl][2-methyl-4-(3,5-dimethylphenyl)-5-methoxy-6-tert-butyl-1H-inden-1-yl]dimethylsilane (22.76 g, 30.14 mmol assuming 100% purity) in 250 ml of ether cooled to −50° C. This mixture was stirred for 5.5 h at room temperature, then the resulting dark red solution was cooled to −50° C., and HfCl$_4$ (9.66 g, 30.16 mmol) was added. The reaction mixture was stirred for 24 h at room temperature to give red solution with some precipitate of LiCl. This mixture was evaporated to dryness (to the state of red foam), and the residue was treated with 100 ml of warm toluene. The obtained suspension was filtered through glass frit (G4), the filtrate was evaporated to ca. 25 ml, and 25 ml of n-hexane was added. The resulting mixture was filtered again through glass frit (G4), and the obtained filtrate was evaporated to dryness. The residue was purified by crystallization from a mixture of 25 ml of n-hexane with 25 ml of n-pentane, then again from 30 ml of pure n-pentane. This procedure gave several crops of a mixture of anti- and syn-complexes in a ratio varying from 70/30 to 90/10. The total weight of all crops was 13.1 g, corresponding to −43.5% yield of the anti/syn complex mixture. Due to the presence of impurities, it was quite difficult to fully purify this metallocene isomer mixture. It was also not possible to isolate pure anti isomer from the resulting mixtures.

Anti-dimethylsilanediyl[2-methyl-4,8-bis(3,5-dimethylphenyl)-1,5,6,7-tetrahydro-s-indacen-1-yl][2-methyl-4-(3,5-dimethylphenyl)-5-methoxy-6-tert-butyl-1H-inden-1-yl] hafnium dichloride (MC1) Obtained With Epimerisation Step

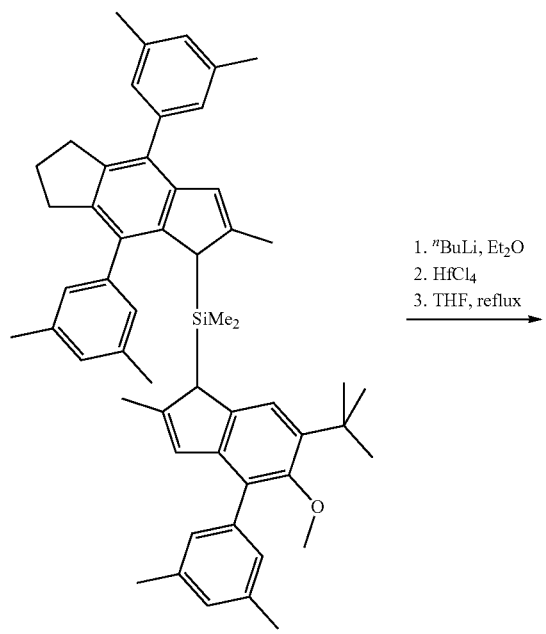

1. "BuLi, Et$_2$O
2. HfCl$_4$
3. THF, reflux

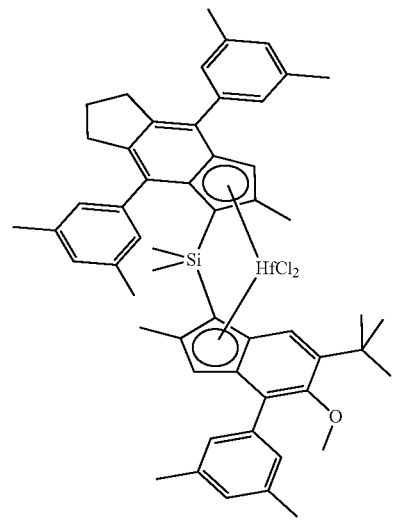

"BuLi in hexanes (2.43 M, 32.2 ml, 78.25 mmol) was added in one portion to a yellowish solution of [2-methyl-4,8-bis(3,5-dimethylphenyl)-1,5,6,7-tetrahydro-s-indacen-1-yl][2-methyl-4-(3,5-dimethylphenyl)-5-methoxy-6-tert-butyl-1H-inden-1-yl]dimethylsilane (29.5 g, 39.07 mmol, 95% purity, prepared as describe above) in 250 ml of ether cooled to −50° C. This mixture was stirred for 5.5 h at room temperature, then the resulting dark red solution was cooled to −50° C., and HfCl$_4$ (12.52 g, 39.09 mmol) was added. The reaction mixture was stirred for 24 h at room temperature to give red solution containing LiCl precipitate. This mixture was evaporated to dryness, 150 ml of THF was added to the residue, and the resulting mixture was heated for 24 h at 65° C. The so obtained mixture was evaporated to dryness, the residue was taken up in 100 ml of warm toluene, the so obtained suspension was filtered through glass frit (G4), and the filter cake was washed with 10 ml of toluene. This solution was evaporated to dryness, and the residue was dissolved in 50 ml of hot n-hexane. The yellow fine crystalline solid precipitated from this solution overnight at room temperature was collected and dried in vacuum. This procedure gave 16.6 g of anti-hafnocene dichloride, containing ca. 1.1 mol of n-hexane per mol of the complex (or 1.4 g of n-hexane in the specified quantity), so the adjusted net weight of the isolated anti-complex was 15.2 g (39%). The mother liquor was evaporated to dryness, and the residue was dissolved in 60 ml of n-pentane. Yellow powder precipitated from this solution over several days at −30° C. was filtered off (G4) and then dried in vacuum to give 9.4 g of the target anti-complex, contaminated with ~5% of an unidentified complex, and containing ca. 0.6 equiv of n-hexane per equiv of the target complex. The total isolated pure anti-MC1 corresponds to 62% isolated yield.

Synthesis of MCC

Anti-dimethylsilanediyl[2-methyl-4,8-di(3,5-dimethylphenyl)-1,5,6,7-tetrahydro-s-indacen-1-yl][2-methyl-4-(3,5-dimethylphenyl)-5-methoxy-6-tert-butylinden-1-yl] zirconium dichloride (MCC)

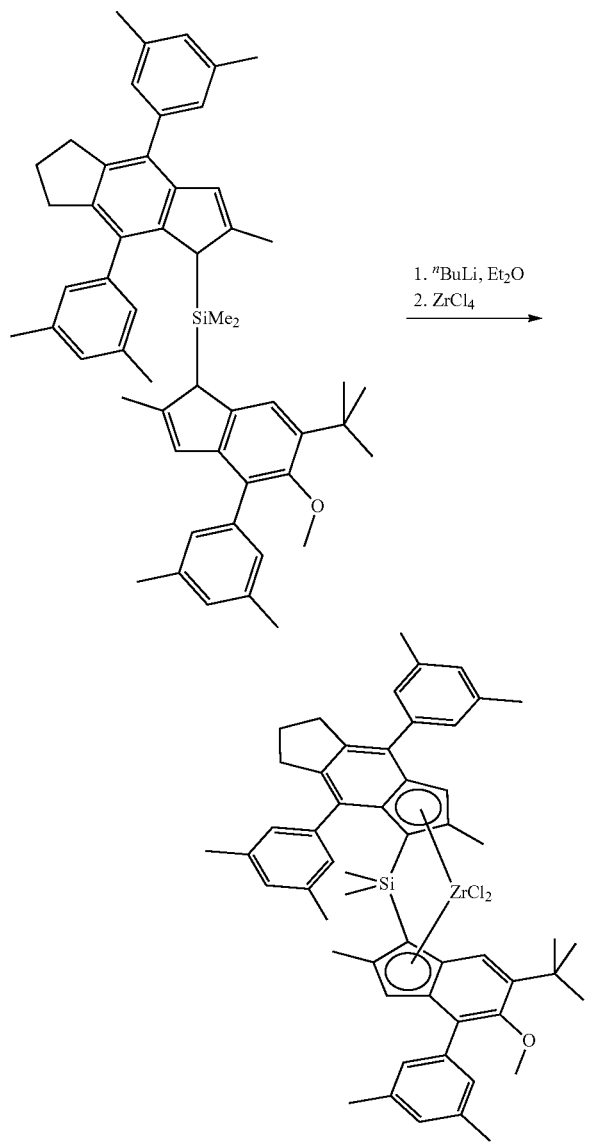

To a slightly cloudy yellowish solution of 23.06 g (30.54 mmol) of [4,8-bis(3,5-dimethylphenyl)-2-methyl-1,5,6,7-tetrahydro-s-indacen-1-yl][6-tert-butyl-4-(3,5-dimethylphenyl)-5-methoxy-2-methyl-1H-inden-1-yl]dimethylsilane in 250 ml of ether, cooled to −30° C., 25.1 ml (60.99 mmol) of 2.43 M $^n$BuLi in hexanes was added in one portion. This mixture was stirred for 5.5 h at room temperature, then, the resulting red solution was cooled to −50° C., and 7.12 g (30.55 mmol) of ZrCl$_4$ was added. The reaction mixture was stirred for 24 h at room temperature to give dark-red solution with precipitate of LiCl. On the evidence of NMR spectroscopy, this solution included a ca. 85/15 mixture of anti- and syn-zirconocene dichlorides contaminated with some other impurities. This mixture was evaporated to dryness (to the state of red foam), and the residue was treated with 100 ml of warm toluene. The obtained suspension was filtered through glass frit (G4), the filter cake was washed with 2×50 ml of warm toluene. The filtrate was evaporated to dryness, and the residue was dissolved in 70 ml of hot n-hexane. The light-orange precipitate fallen from this solution overnight at room temperature was collected and dried in vacuum. This procedure gave 7.8 g of anti-dimethylsilanediyl[2-methyl-4,8-di(3,5-dimethylphenyl)-1,5,6,7-tetrahydro-s-indacen-1-yl][2-methyl-4-(3,5-dimethylphenyl)-5-methoxy-6-tert-butylinden-1-yl]zirconium dichloride, containing ca. 1.0 mol of n-hexane per mol of the complex, so the adjusted net weight of the isolated anti-complex was 7.13 g (26%). The mother liquor was evaporated to ca. 60 ml. Light-orange powder precipitated from this solution overnight at −25° C. was collected and dried in vacuum. This procedure gave 8.6 g of anti-dimethylsilanediyl[2-methyl-4,8-di(3,5-dimethylphenyl)-1,5,6,7-tetrahydro-s-indacen-1-yl][2-methyl-4-(3,5-dimethylphenyl)-5-methoxy-6-tert-butylinden-1-yl]zirconium dichloride, containing ca. 0.75 mol of n-hexane per mol of the complex (or 0.57 g of n-hexane in 8.6 g of the product), so the adjusted net weight of the isolated anti-complex was 8.03 g (29%). Thus the combined isolated yield of anti-dimethylsilanediyl[2-methyl-4,8-di(3,5-dimethylphenyl)-1,5,6,7-tetrahydro-s-indacen-1-yl][2-methyl-4-(3,5-dimethylphenyl)-5-methoxy-6-tert-butylinden-1-yl] zirconium dichloride is only 55%.

anti-dimethylsilanediyl[2-methyl-4,8-di(3,5-dimethylphenyl)-1,5,6,7-tetrahydro-s-indacen-1-yl][2-methyl-4-(3,5-dimethylphenyl)-5-methoxy-6-tert-butylinden-1-yl]zirconium dichloride×1.0 hexane.

Anal. calc. for $C_{54}H_{60}Cl_2OSiZr×C_6H_{14}$: C, 71.96; H, 7.45. Found: C, 72.30; H, 7.69.

$^1$H NMR (CDCl$_3$): δ 7.55-6.90 (very br.s., 4H), 7.39 (s, 1H), 7.10 (s, 1H), 7.03 (s, 1H), 6.98 (s, 1H), 6.95 (s, 1H), 6.94 (s, 1H), 6.81 (s, 1H), 6.58 (s, 1H), 3.41 (s, 3H), 3.15-3.01 (m, 2H), 2.93 (ddd, J=16.0 Hz, 8.1 Hz, 3.3 Hz, 1H), 2.51-2.41 (m, 1H), 2.39 (s, 3H), 2.36 (s, 3H), 2.34 (s, 12H), 2.30 (s, 3H), 2.04 (s, 3H), 2.07-1.95 (m, 1H), 1.85-1.68 (m, 1H), 1.35 (s, 9H), 1.14 (s, 3H), −0.13 (s, 3H). $^{13}$C{$^1$H} NMR (CDCl$_3$): δ 159.87, 144.73, 144.10, 143.25, 141.39, 138.39, 138.08, 137.81, 137.47, 136.90, 134.61, 134.39, 134.26, 132.05, 131.96, 131.74, 131.11, 128.96, 128.91, 128.82, 128.74, 127.74, 127.44, 127.01 (br.s), 126.76, 123.42, 123.12, 121.60, 121.08, 82.55, 81.91, 62.67, 35.68, 33.87, 32.39, 30.39, 26.04, 21.53, 21.47, 21.41, 21.24, 19.78, 18.60, 3.62, 1.70.

Alternative Synthesis with Improved Epimerisation Procedure

Inventive Examples with MCC

Step 1: Synthesis of Mixture of Anti- and Syn-Isomers of the Metallocene Complex in di-n-butyl ether $^n$BuLi in hexanes (8.7 ml, 2.43 M, 21.14 mmol) was added in one portion at room temperature to a yellowish solution of 8.0 g (10.59 mmol) of [4,8-bis(3,5-dimethylphenyl)-2-methyl-1,5,6,7-tetrahydro-s-indacen-1-yl][6-tert-butyl-4-(3,5-dimethyl-phenyl)-5-methoxy-2-methyl-1H-inden-1-yl] dimethylsilane (purity ca. 88%) in 100 ml of $^n$Bu$_2$O. This mixture was stirred for 17 h at room temperature to give a red solution, then 2.47 g (10.6 mmol) of ZrCl$_4$ was added to it. The reaction mixture was stirred for 24 h at room temperature to give a red solution with yellow precipitate. On the evidence of NMR spectroscopy, this mixture included a ca. 85/15 mixture of anti- and syn-zirconocene dichlorides contaminated with some impurities. This reaction mixture was evaporated to dryness. The residue was taken up in 60 ml of toluene, and the formed mixture was filtered through a glass frit (G4). The filtrate was evaporated to dryness, and the precipitate was dissolved in 30 ml of n-hexane. Orange powder precipitated from this solution overnight at −25° C. and was collected and dried in vacuum. This procedure gave 7.2 g of a ca. 80:12 mixture of anti- and syn-zirconocene dichlorides contaminated with ca. 8% of impurities and containing ca. 0.76 mol of n-hexane per mol of the complex (or 0.48 g of n-hexane in 7.2 g of the product), so the adjusted net weight of the isolated mixture of anti- and syn-zirconocene dichlorides was ca. 6.72 g (69%).

The synthesis in di-n-butylether has been repeated at both lower and higher temperatures, giving the results shown in the table below.

| Temperature, ° C. | Isolated yield of the anti/syn mix, wt % | anti/syn ratio |
|---|---|---|
| 0 | 76 | 83:17 |
| 23 | 69 | 85:15 |
| 60 | 61 | 82:18 |

Step 2: Epimerisation 2.1 Epimerisation with LiCl-THF

LiCl (300 mg) and THF (20 ml) were added to 1.80 g (1.97 mmol) of the orange powder obtained from the synthesis at room temperature, and the obtained mixture was stirred for 20 h at 65° C. Then the reaction temperature was raised to 80° C. and stirring was continued at this temperature. The progress of epimerisation was monitored by $^1$H NMR spectroscopy, and the results are shown in the table below:

| Time, h | Temperature, ° C. | anti/syn ratio | Organometallic impurities, % |
|---|---|---|---|
| 0 (initial ratio) | | ca. 80:12 | 8 |
| 20 | 65 | ca. 87:13 | 0 |
| 40 | 80 | ca. 90:10 | 0 |
| 60 | 80 | ca. 92:8 | 0 |
| 80 | 80 | ca. 95:5 | 0 |

Therefore, the yield and purity of the anti isomer obtainable with this process (synthesis followed by epimerisation with LiCl in THF) can be significantly increased and purification of the anti-isomer can be facilitated (only one crystallisation is necessary to bring the anti/syn ratio above 99:1).

2.2 Epimerisation with TEBAC

TEBAC (10.0 g, 43.9 mmol) and ″Bu$_2$O (170 ml) were added to 27.5 g of a mixture of syn- and anti-dimethylsilanediyl[2-methyl-4,8-di(3,5-dimethylphenyl)-1,5,6,7-tetrahydro-s-indacen-1-yl][2-methyl-4-(3,5-dimethylphenyl)-5-methoxy-6-tert-butylinden-1-yl] zirconium dichloride (MCC) with an anti-/syn-ratio of approx. 85:15. The obtained mixture was stirred at 120° C. for 70 h. Then this mixture was evaporated to dryness, the residue was taken up with 150 ml of toluene and the suspension was heated to 80° C. for 20 min and then filtered through glass frit (G4). On the evidence of $^1$H NMR spectroscopy, the resulting filtrate contains a mixture of anti- and syn-zirconocene dichlorides in the ratio anti/syn=97:3, contaminated with about 10% impurities.

The filtrate was evaporated to a highly viscous state (state of oil) which, then, was dissolved in 30 ml of hot n-hexane. The obtained hot suspension was filtered through glass frit. Orange powder precipitated from the filtrate for 5 min at room temperature was collected and dried under vacuum. This procedure gave 13.8 g of anti-dimethylsilanediyl[2-methyl-4,8-di(3,5-dimethylphenyl)-1,5,6,7-tetrahydro-s-indacen-1-yl][2-methyl-4-(3,5-dimethylphenyl)-5-methoxy-6-tert-butylinden-1-yl] zirconium dichloride (MCC) containing 0.1 g of ″Bu$_2$O and 0.06 g of n-hexane.

The mother liquor was evaporated to dryness, the residue was recrystallized from 25 ml of n-pentane overnight at −25° C. Precipitated orange powder was collected and dried in vacuum. This procedure gave extra 2.4 g of anti-dimethylsilanediyl[2-methyl-4,8-di(3,5-dimethylphenyl)-1,5,6,7-tetrahydro-s-indacen-1-yl][2-methyl-4-(3,5-dimethylphenyl)-5-methoxy-6-tert-butylinden-1-yl] zirconium dichloride (MCC) containing 17 mg of ″Bu$_2$O and 10 mg of n-pentane.

Finally, the mother liquor was evaporated to dryness, and the resulting orange solid was dried in vacuum. Crystallization of this material from 15 ml of n-pentane overnight at −25° C. gave 1.26 g of anti-dimethylsilanediyl[2-methyl-4,8-di(3,5-dimethylphenyl)-1,5,6,7-tetrahydro-s-indacen-1-yl][2-methyl-4-(3,5-dimethylphenyl)-5-methoxy-6-tert-butylinden-1-yl] zirconium dichloride (MCC) containing 90 mg of n-pentane. The overall isolated yield of the pure anti-isomer was thus 63 wt %.

2.3 Epimerisation in CH$_2$Cl$_2$ with TEBAC

TEBAC (24 mg, 0.105 mmol, 20 mol. %) and 2 ml of CH$_2$Cl$_2$ were added to 0.48 g (0.52 mmol) of a ca. 85:15 mixture of anti- and syn-dimethylsilanediyl[2-methyl-4,8-di(3,5-dimethylphenyl)-1,5,6,7-tetrahydro-s-indacen-1-yl][2-methyl-4-(3,5-dimethylphenyl)-5-methoxy-6-tert-butylinden-1-yl] zirconium dichloride (MCC). The obtained reddish homogeneous mixture was stirred at room temperature for 96 h. Afterwards, additional 24 mg (0.105 mmol, 20 mol. %, i.e. 40 mol. % in total) of TEBAC were added, and the reaction mixture was stirred at this temperature for 48 h. The progress in isomerization was monitored by $^1$H NMR spectroscopy (the results are listed in the table below).

| Time, h | anti/syn ratio |
|---|---|
| 0 (initial ratio) | ca. 85/15 |
| 24 | ca. 89/11 |
| 96 | ca. 91/9 |
| 144* | ca. 95/5 |

*Additional TEBAC was added after 96 h

Comparative Examples with Dimethylsilanediyl[2-methyl-4-(3,5-dimethylphenyl)-5-methoxy-6-tert-butylinden-1-yl][2-methyl-4-(3,5-dimethylphenyl)-5,6,7-trihydro-s-indacen-1-yl]zirconium dichloride (MC$_{Reference}$)

Step 1: Synthesis of Mixture of Anti- and Syn-Isomers of MC$_{Reference}$ in di-n-butyl ether Dimethylsilanediyl[2-methyl-4-(3,5-dimethylphenyl)-5-methoxy-6-tert-butylinden-1-yl][2-methyl-4-(3,5-dimethylphenyl)-5,6,7-trihydro-s-indacen-1-yl]zirconium dichloride (MC$_{Reference}$):

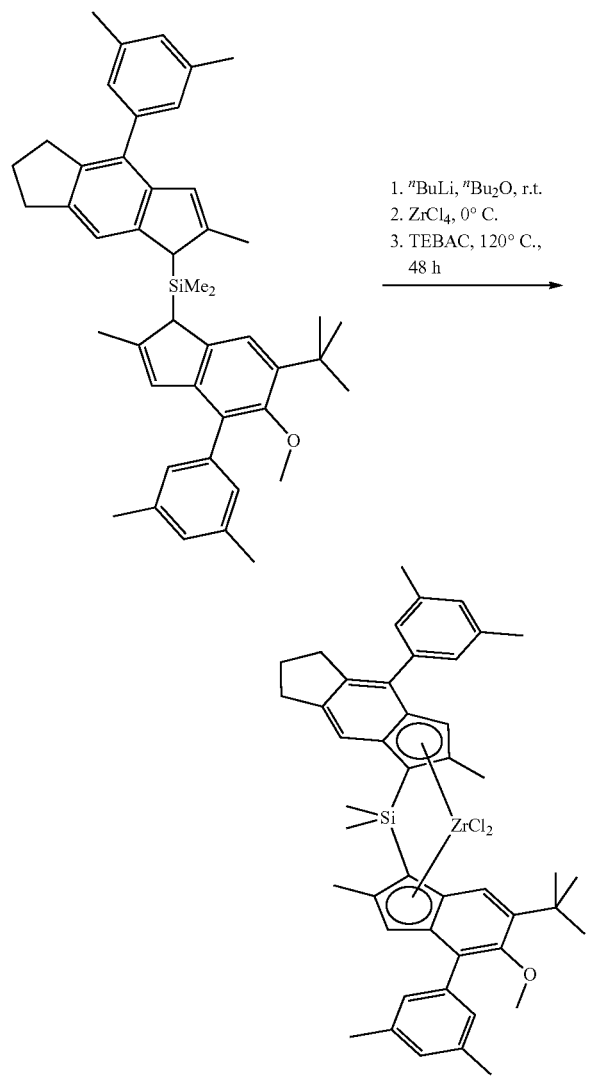

1. $^n$BuLi, $^n$Bu$_2$O, r.t.
2. ZrCl$_4$, 0° C.
3. TEBAC, 120° C., 48 h $^n$BuLi in hexanes (12.4 ml, 2.43 M, 30.13 mmol) was added in one portion at room temperature to a yellowish solution of 9.77 g (15.01 mmol) of [6-tert-butyl-4-(3,5-dimethylphenyl)-5-methoxy-2-methyl-1H-inden-1-yl][4-(3,5-dimethylphenyl)-2-methyl-1,5,6,7-tetrahydro-s-indacen-1-yl]dimethylsilane (obtained as described in WO2018/122134, purity ca. 94%) in 125 ml of $^n$Bu$_2$O. This mixture was stirred 17 h at room temperature to give a red solution that was cooled in an ice bath. Then, 3.5 g (15.02 mmol) of ZrCl$_4$ was added to it. The reaction mixture was stirred for 24 h at room temperature to give an orange solution with orange precipitate. On the evidence of $^1$H NMR spectroscopy, this mixture included a ca. 1:1 mixture of anti- and syn-zirconocene dichlorides contaminated with some impurities. The reaction mixture was partially evaporated to remove most of hexanes (in total, ca. 15 ml of the solvent was distilled off).

Step 2: Epimerisation

TEBAC (3.50 g, 15.37 mmol) was added to the residue, and the resulting mixture was stirred 48 h at 120° C. Then, the reaction mixture was evaporated to dryness, the residue was heated with 100 ml of toluene, and the obtained hot suspension was filtered through glass frit (G4). On the evidence of $^1$H NMR spectroscopy, the filtrate included a ca. 60:40 mixture of anti- and syn-zirconocene dichlorides contaminated with some impurities.
Preparation of MAO-Silica Support.

A steel reactor equipped with a mechanical stirrer and a filter net was flushed with nitrogen and the reactor temperature was set to 20° C. Next silica grade DM-L-303 from AGC Si-Tech Co, pre-calcined at 600° C. (7.4 kg) was added from a feeding drum followed by careful pressuring and depressurising with nitrogen using manual valves. Then toluene (32.2 kg) was added. The mixture was stirred (40 rpm) for 15 min. Next 30 wt % solution of MAO in toluene (17.5 kg) from Lanxess was added via 12 mm line on the top of the reactor within 70 min. The reaction mixture was then heated up to 90° C. and stirred at 90° C. for additional two hours. The slurry was allowed to settle and the mother liquor was filtered off. The solid was washed twice with toluene (32.2 kg) at 90° C., following by settling and filtration. The reactor was cooled off to 60° C. and the solid was washed with heptane (32.2 kg).

Finally the solid was dried at 60° C. for 2 h under nitrogen flow 2 kg/h, pressure 0.3 barg and then for 5 hours under vacuum (−0.5 barg) with stirring at 5 rpm. This solid MAO-silica carrier was collected as a free-flowing white powder containing 12.7% Al by weight.
Catalyst Preparation Catalyst CE1a (comparative). In a nitrogen filled glovebox, a solution of MAO 0.2 mL (30 wt % in toluene, AXION 1330 CA Lanxess) in dry toluene (2.3 mL) was added to an aliquot of metallocene MCC (24.9 mg, 27 µmol). The mixture was stirred for 60 minutes at room temperature. Next, 2.0 g of MAO treated silica prepared as described above, was placed in a glass reactor equipped with a porous glass frit. The solution of metallocene and MAO in toluene was then slowly added to the support over the course of 5 minutes with gentle mixing. The resulting mixture was shaken well and allowed to stay overnight. Then dry toluene (10 mL) was added, and the slurry was mixed well with the inert gas sparging through the filter net over 10 minutes. The solid was allowed to settle, and liquid was filtered off and discarded. The resulting cake was dried in vacuum for 1 hour to yield 1.9 g of the catalyst as pink free flowing powder.
Catalyst CE1b (Comparative)

30 wt % MAO in toluene (0.7 kg) was added into a steel nitrogen blanked reactor via a burette at 20° C. Toluene (5.4 kg) was then added under stirring. Metallocene MCC (93 g) was added from a metal cylinder followed by flushing with 1 kg toluene. The mixture was stirred for 60 minutes at 20° C. Trityl tetrakis(pentafluorophenyl)borate (91 g) was then added from a metal cylinder followed by a flush with 1 kg of toluene. The mixture was stirred for 1 h at room temperature. The resulting solution was added to a stirred cake of MAO-silica carrier, prepared as described above, over 1 hour. The cake was allowed to stay for 12 hours, followed by drying under $N_2$ flow at 60° C. for 2 h and additionally for 5 h under vacuum (−0.5 barg) under stirring.

Dried catalyst was sampled in the form of pink, free flowing powder containing 13.9% Al and 0.11% Zr.

Catalyst IE1a (Inventive)

In a nitrogen filled glovebox, a solution of MAO 0.2 mL (30 wt % in toluene, AXION 1330 CA Lanxess) in dry toluene (2.3 mL) was added to an aliquot of metallocene MC1 (29.7 mg, 27 µmol). The mixture was stirred for 30 minutes at room temperature. Then trityl tetrakis(pentafluorophenyl)borate (25.6 mg, 28 µmol) was added to the mixture, and the mixture was stirred for another 30 minutes. Next, 2.0 g of MAO-silica carrier prepared as described above, was placed in a glass reactor equipped with a porous glass frit. A solution of metallocene and MAO in toluene was then slowly added to the support over the course of 5 minutes with gentle mixing. The resulting mixture was shaken well and allowed to stay overnight. Then dry toluene (10 mL) was added, and the slurry was mixed well with the inert gas sparging through the filter net over 10 minutes. The solid was allowed to settle, and liquid was filtered off and discarded. The resulting cake was dried in vacuum for 1 hour to yield 1.9 g of the catalyst as yellow free flowing powder.

TABLE 1

Catalyst summary:

| Example | MC | B:TM Molar (*) | Al found, wt % | Zr found, wt % | Hf found, wt % | MC wt % (**) |
|---|---|---|---|---|---|---|
| CE1a | MCC | 0 | 12.9 | 0.083 | — | 0.86 |
| CE1b | MCC | 1 | 13.9 | 0.11 | — | 1.07 |
| IE1a | MC1 | 1 | 13.0 | — | 0.17 | 0.95 |

(*) Boron to transition metal molar ratio;
(**) calculated metallocene content in catalyst Polymerisations The details of the polymerisation procedures are described in the following:

Step 1: Prepolymerisation and Bulk Homopolymerisation

A 20.9 L stainless-steel reactor containing 0.4 barg propylene was filled with 3950 g propylene. Triethylaluminum (0.80 ml of a 0.62 mol/l solution in heptane) was injected into the reactor by additional 240 g propylene. The solution was stirred at 20° C. and 250 rpm for at least 20 min. The catalyst was injected as described in the following. The desired amount of solid, catalyst was loaded into a 5 ml stainless steel vial and a second 5 ml vial containing 4 ml n-heptane was added on top inside a glovebox. Then the vial on top was pressurized with 5 bars of nitrogen. This catalyst feeder system is mounted on a port on the lid of the reactor. Immediately afterwards 2.0 or 0.1 NL of $H_2$ (see polymerisation tables) was dosed via mass flow controller in one minute. The valve between the two vials was opened and the solid catalyst was contacted with heptane under nitrogen pressure for 2 s, then flushed into the reactor with 340 g propylene. The prepolymerisation was run for 10 min at 20° C. At the end of the prepolymerisation step the temperature was raised to 75° C. When only 0.1 NL of $H_2$ was fed before the catalyst, then, when the internal reactor temperature has reached 60° C., 1.9 NL of $H_2$ was added via mass flow controller. The reactor temperature was held constant at 75° C. throughout the polymerisation. The polymerisation time was measured starting when the internal reactor temperature reached 2° C. below the set polymerisation temperature.

Step 2: Gas Phase Ethylene-Propylene Copolymerisation

After the bulk homopolymerisation step was completed, the stirrer speed was reduced to 50 rpm and the pressure was reduced down to 0.4 barg by venting the monomers. Then triethylaluminum (0.80 ml of a 0.62 mol/l solution in heptane) was injected into the reactor by additional 250 g propylene through a steel vial. The pressure was then again reduced down to 0.4 barg by venting the monomers. The stirrer speed was set to 180 rpm and the reactor temperature was set to 70° C.

Then the reactor pressure was increased to 20 barg by feeding a desired $C_2/C_3$ gas mixture (see polymerisation tables) of composition defined by:

$$\left(\frac{C_2}{C_3}\right)_{gas\ feed\ in\ transition} = \frac{\left(\frac{C_2}{C_3}\right)_{target\ polymer\ composition}}{R}$$

where $C_2/C_3$ is the weight ratio of the two monomers and R is their reactivity ratio. In the present experiments, we used R=0.44 and 0.49 for the zirconium catalysts CE1a and CE1b respectively, and 0.38 for the hafnium catalyst IE1a.

The temperature is held constant by thermostat and the pressure is kept constant by feeding via mass flow controller a $C_2/C_3$ gas mixture of composition corresponding to the target polymer composition, until the set duration for this step has lapsed.

Then the reactor is cooled down to about 30° C. and the volatile components flashed out. After purging the reactor 3 times with $N_2$ and one vacuum/$N_2$ cycle, the product is taken out and dried overnight in a fume hood. 100 g of the polymer is additivated with 0.5 wt % Irganox B225 (solution in acetone) and dried overnight in a hood followed by one hour in a vacuum drying oven at 60° C.

TABLE 2

Polymerisation examples: set-up, prepoly and transition to bulk step

| patent example # | catalyst | Matrix produced in liquid monomer step 1 | Target wt % C2 in gas phase EPR | catalyst amount mg | MC content of catalyst wt % | $H_2$ fed before catalyst injection NL | C3 total G | Time transition from prepoly to bulk min | $H_2$ fed at the end of the transition NL |
|---|---|---|---|---|---|---|---|---|---|
| CPE1 | CE1a | hPP | C2 = 25 | 59.0 | 0.86 | 2.02 | 4463 | 17 | 0.000 |
| CPE2 | CE1a | hPP | C2 = 40 | 56.0 | 0.86 | 2.02 | 4454 | 17 | 0.000 |
| CPE3 | CE1a | hPP | C2 = 25 | 64.0 | 0.86 | 0.10 | 4450 | 20 | 1.915 |
| CPE4 | CE1a | hPP | C2 = 40 | 66.0 | 0.86 | 0.10 | 4450 | 20 | 1.915 |

TABLE 2-continued

Polymerisation examples: set-up, prepoly and transition to bulk step

| patent example # | catalyst | Matrix produced in liquid monomer step 1 | Target wt % C2 in gas phase EPR | catalyst amount mg | MC content of catalyst wt % | H₂ fed before catalyst injection NL | C3 total G | Time transition from prepoly to bulk min | H₂ fed at the end of the transition NL |
|---|---|---|---|---|---|---|---|---|---|
| CPE5 | CE1b | hPP | C2 = 25 | 52.0 | 1.07 | 2.00 | 4458 | 16 | 0.000 |
| CPE6 | CE1b | hPP | C2 = 40 | 47.0 | 1.07 | 2.01 | 4461 | 17 | 0.000 |
| CPE7 | CE1b | hPP | C2 = 60 | 49.0 | 1.07 | 2.01 | 4461 | 16 | 0.000 |
| CPE8 | CE1b | hPP | C2 = 25 | 60.0 | 1.07 | 0.10 | 4377 | 16 | 1.900 |
| CPE9 | CE1b | hPP | C2 = 40 | 59.0 | 1.07 | 0.10 | 4478 | 16 | 1.900 |
| CPE10 | CE1b | hPP | C2 = 60 | 59.0 | 1.07 | 0.10 | 4461 | 17 | 1.900 |
| IPE1 | IE1a | hPP | C2 = 40 | 136.0 | 0.95 | 2.02 | 4453 | 17 | 0.000 |
| IPE2 | IE1a | hPP | C2 = 60 | 141.0 | 0.95 | 2.02 | 4447 | 17 | 0.000 |
| IPE3 | IE1a | hPP | C2 = 25 | 202.0 | 0.95 | 0.10 | 4446 | 18 | 1.916 |
| IPE4 | IE1a | hPP | C2 = 40 | 207.0 | 0.95 | 0.10 | 4451 | 18 | 1.916 |

TABLE 3

Polymerisation examples: bulk, transition to gas phase, and gas phase steps

| patent example # | catalyst | total H₂ NL | time min | Pressure flashed down to barg | Time transition from bulk to GP Min | C₂ fed in transition (MFC) G | C₃ fed in transition (MFC) g | feed C₂/C₃ during transition (actual) wt/wt | Ptotal av. barg | time min | C₂ fed in GP (MFC) g | C₃ fed in GP (MFC) g |
|---|---|---|---|---|---|---|---|---|---|---|---|---|
| CPE1 | CE1a | 2.02 | 40 | 0.4 | 16 | 242 | 321 | 0.75 | 20 | 90 | 70 | 214 |
| CPE2 | CE1a | 2.02 | 40 | 0.4 | 14 | 304 | 206 | 1.48 | 20 | 90 | 58 | 101 |
| CPE3 | CE1a | 2.02 | 30 | 0.4 | 16 | 250 | 331 | 0.75 | 20 | 120 | 204 | 613 |
| CPE4 | CE1a | 2.02 | 30 | 0.4 | 17 | 320 | 214 | 1.50 | 20 | 120 | 204 | 308 |
| CPE5 | CE1b | 2.00 | 40 | 0.4 | 23 | 238 | 346 | 0.69 | 20 | 90 | 43 | 128 |
| CPE6 | CE1b | 2.01 | 40 | 0.4 | 17 | 289 | 214 | 1.35 | 20 | 90 | 65 | 112 |
| CPE7 | CE1b | 2.01 | 40 | 0.4 | 18 | 337 | 111 | 3.04 | 20 | 90 | 79 | 54 |
| CPE8 | CE1b | 2.00 | 30 | 0.4 | 21 | 238 | 343 | 0.69 | 20 | 120 | 189 | 576 |
| CPE9 | CE1b | 2.00 | 30 | 0.4 | 16 | 296 | 217 | 1.36 | 20 | 120 | 149 | 222 |
| CPE10 | CE1b | 2.00 | 30 | 0.4 | 17 | 350 | 118 | 2.97 | 20 | 120 | 146 | 99 |
| IPE1 | IE1a | 2.02 | 40 | 0.4 | 13 | 311 | 180 | 1.72 | 20 | 90 | 33 | 48 |
| IPE2 | IE1a | 2.02 | 40 | 0.4 | 15 | 357 | 92 | 3.89 | 20 | 90 | 49 | 28 |
| IPE3 | IE1a | 2.02 | 30 | 0.4 | 13 | 254 | 292 | 0.87 | 20 | 120 | 84 | 257 |
| IPE4 | IE1a | 2.02 | 30 | 0.4 | 15 | 319 | 184 | 1.73 | 20 | 120 | 111 | 179 |

TABLE 4

Polymerisation examples: Results

| patent example # | catalyst | Total yield g | Overall productivity kg/g cat | MC productivity kg/gMC | yield GP calculated from SF g | productivity in GP calculated from SF kgPP/g_cat | split matrix hPP (based on soluble fraction) % | split EPR, gas phase (based on SF) % | MFR₂ powder g/10 min | XS wt % | Soluble Fraction Crystex wt % |
|---|---|---|---|---|---|---|---|---|---|---|---|
| CPE1 | CE1a | 1418 | 24.0 | 2795 | 303 | 5.1 | 79 | 21 | 1.0 | 20.4 | 21.4 |
| CPE2 | CE1a | 1219 | 21.8 | 2531 | 193 | 3.4 | 84 | 16 | 1.4 | 15.0 | 15.8 |
| CPE3 | CE1a | 1086 | 17.0 | 1973 | 819 | 12.8 | 25 | 75 | 0.2 | 66.6 | 75.4 |
| CPE4 | CE1a | 802 | 12.2 | 1413 | 525 | 8.0 | 35 | 66 | 0.3 | 58.0 | 65.5 |
| CPE5 | CE1b | 1097 | 21.1 | 1972 | 178 | 3.4 | 84 | 16 | 2.2 | 15.9 | 16.2 |
| CPE6 | CE1b | 1403 | 29.9 | 2790 | 174 | 3.7 | 88 | 12 | 2.3 | 11.7 | 12.4 |
| CPE7 | CE1b | 1260 | 25.7 | 2403 | 120 | 2.4 | 91 | 10 | 2.9 | 9.0 | 9.5 |
| CPE8 | CE1b | 1300 | 21.7 | 2025 | 784 | 13.1 | 40 | 60 | 0.8 |  | 60.3 |
| CPE9 | CE1b | 930 | 15.8 | 1473 | 356 | 6.0 | 62 | 38 | 3.0 |  | 38.3 |
| CPE10 | CE1b | 800 | 13.6 | 1267 | 222 | 3.8 | 72 | 28 | 3.5 |  | 27.8 |
| IPE1 | IE1a | 1109 | 8.2 | 858 | 94 | 0.7 | 92 | 8 | 0.7 | 7.7 | 8.5 |
| IPE2 | IE1a | 1090 | 7.7 | 814 | 73 | 0.5 | 93 | 7 | 0.8 | 6.4 | 6.7 |
| IPE3 | IE1a | 1323 | 6.5 | 689 | 320 | 1.6 | 76 | 24 | 0.5 | 21.9 | 24.2 |
| IPE4 | IE1a | 1140 | 5.5 | 580 | 280 | 1.4 | 75 | 25 | 1.2 | 21.6 | 24.6 |

TABLE 4-continued

| | | Polymerisation examples: Results | | | | | | |
|---|---|---|---|---|---|---|---|---|
| patent example # | catalyst | IV (SF) (Crystex) dl/g | C2 (SF) (Crystex) wt % | $M_n$ g/mol | $M_w$ g/mol | $M_w/M_n$ | $T_c$ °C. | $T_m$ °C. |
| CPE1 | CE1a | 4.5 | 21.7 | 174000 | 509500 | 2.9 | 111.9 | 152.8 |
| CPE2 | CE1a | 4.4 | 33.6 | 159500 | 434000 | 2.7 | 111.9 | 152.0 |
| CPE3 | CE1a | 5.3 | 24.9 | n.m. | n.m. | n.m. | 112.4 | 152.7 |
| CPE4 | CE1a | 5.1 | 39.3 | 186000 | 559500 | 3.0 | 112.3 | 151.0 |
| CPE5 | CE1b | 3.8 | 22.2 | 153500 | 459000 | 3.0 | 112.4 | 155.3 |
| CPE6 | CE1b | 3.5 | 33.6 | n.m. | n.m. | n.m. | 113.2 | 156.1 |
| CPE7 | CE1b | 4.0 | 47.3 | n.m. | n.m. | n.m. | | |
| CPE8 | CE1b | 4.2 | 23.2 | 147000 | 472000 | 3.2 | 114.4 | 154.7 |
| CPE9 | CE1b | 3.4 | 36.9 | 145000 | 414500 | 2.9 | 114.5 | 154.7 |
| CPE10 | CE1b | 4.4 | 54.0 | 160500 | 454500 | 2.8 | 114.6 | 155.1 |
| IPE1 | IE1a | 6.4 | 28.4 | n.m. | n.m. | n.m. | 114.9 | 160.2 |
| IPE2 | IE1a | 6.0 | 44.8 | n.m. | n.m. | n.m. | 116.0 | 159.4 |
| IPE3 | IE1a | 7.6 | 21.7 | 428000 | 1070000 | 2.5 | 114.1 | 158.1 |
| IPE4 | IE1a | 6.1 | 36.2 | 289000 | 678000 | 2.3 | | |

The invention claimed is:

1. A metallocene complex of formula (I):

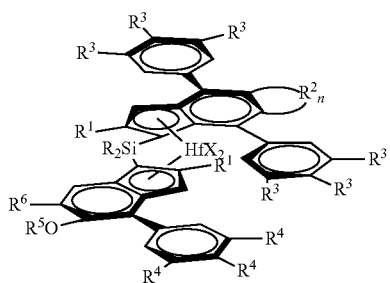

Formula (I)

wherein
each X is a sigma-ligand;
in the group $R_2Si$— at least one R is methyl or ethyl, and the other R is selected from methyl, ethyl, n-propyl, isopropyl, n-butyl or isobutyl, pentyl, hexyl, cyclohexyl and phenyl;
each $R^1$ independently is a $CH_2$—$R^7$ group, with $R^7$ being H or linear or branched $C_{1-6}$-alkyl group, $C_{3-8}$ cycloalkyl group, or $C_{6-10}$ aryl group;
each $R^2$ is independently a —CH=, —CY=, —$CH_2$—, —CHY— or —$CY_2$— group, wherein Y is a $C_{1-6}$ hydrocarbyl group and where n is 2-6;
each $R^3$ and $R^4$ independently is hydrogen, a linear or branched $C_{1-6}$-alkyl group, a $C_{7-20}$ arylalkyl, $C_{7-20}$ alkylaryl group, $C_{6-20}$ aryl group, or an —OY group, wherein Y is a is a $C_{1-6}$ hydrocarbyl group;
$R^5$ is a linear or branched $C_{1-6}$-alkyl group, $C_{7-20}$ arylalkyl, $C_{7-20}$ alkylaryl group or $C_{6-20}$-aryl group; and
$R_6$ is a $C(R^8)_3$ group, with each $R^8$ being independently a linear or branched $C_{1-6}$ alkyl group;
(A) wherein at least one $R^3$ per phenyl group and at least one $R^4$ is not hydrogen, and wherein at least one $R^3$ per phenyl group and at least one $R^4$ is hydrogen; or
(B) wherein one $R^3$ is an —OY group, wherein Y is a is a $C_{1-6}$ hydrocarbyl group, in 4 position of each phenyl group and the two other $R^3$ groups are tert-butyl groups; and/or
(C) wherein one $R^4$ is an —OY group, wherein Y is a is a $C_{1-6}$ hydrocarbyl group, in 4-position of the phenyl ring and the two other $R^4$ groups are tert-butyl groups.

2. The metallocene complex according to claim 1, wherein:

each X is independently a hydrogen atom, halide, $C_{1-6}$ alkoxy group, or an R' group, where R' is a $C_{1-6}$ alkyl, phenyl or benzyl group;

$R_2Si$— is $Me_2Si$—, $Et_2Si$— or (cyclohexyl)Me-Si—;

each $R^1$ independently is a $CH_2$—$R^7$ group, with $R^7$ being H, linear or branched $C_{1-6}$-alkyl group, or $C_{6-10}$ aryl group;

each $R^2$ is independently a —CH=, —CY=, —$CH_2$—, —CHY— or —$CY_2$— group, wherein Y is a $C_{1-4}$ hydrocarbyl group and where n is 3-4, each $R^3$ and $R^4$ independently is hydrogen, a linear or branched $C_1$-$C_6$-alkyl group or $C_{6-20}$ aryl group, wherein at least one $R^3$ per phenyl group and at least one $R^4$ is not hydrogen and wherein at least one $R^3$ per phenyl group and at least one $R^4$ is hydrogen, $R^5$ is a linear or branched $C_1$-$C_6$ alkyl group or $C_{6-20}$ aryl group and $R^6$ is a $C(R^8)_3$ group, with each $R^8$ being independently a linear or branched $C_1$-$C_4$ alkyl group.

3. The metallocene complex according to claim 1, wherein:

each X is independently a chloride, benzyl or a methyl group, both $R^1$ groups are the same and are a $CH_2$—$R^7$ group, with $R^7$ being H or linear or branched $C_1$-$C_3$-alkyl group, each $R^2$ is a —$CH_2$— group where n is 3-4, each $R^3$ and $R^4$ independently is hydrogen, a linear or branched $C_1$-$C_6$-alkyl group, or $C_{6-20}$ aryl group, wherein at least one $R^3$ per phenyl group and at least one $R^4$ is not hydrogen and wherein at least one $R^3$ per phenyl group and at least one $R^4$ is hydrogen, $R^5$ is a linear or branched $C_1$-$C_6$ alkyl group or $C_{6-20}$ aryl group and $R^6$ is a $C(R^8)_3$ group, $R^8$ being the same and being a $C_1$-$C_2$-alkyl group.

4. The metallocene complex as claimed in claim 1, wherein the metallocene complex is of formula (II)

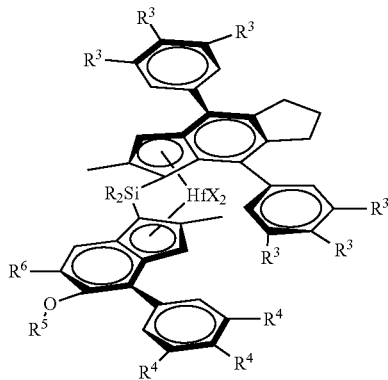

(II)

wherein
each X is a sigma-ligand selected from chloride, benzyl, and $C_{1-6}$-alkyl;
$R_2Si—$ is $Me_2Si$ or $Et_2Si—$;
each $R^3$ and $R^4$ independently is hydrogen, a linear or branched $C_{1-6}$-alkyl group, or —OY group where Y is a $C_{1-6}$ alkyl group; and wherein:
(A) at least one $R^3$ per phenyl group and at least one $R^4$ is not hydrogen, and at least one $R^3$ per phenyl group and at least one $R^4$ is hydrogen; or
(B) at least one $R^3$ is an —OY group, wherein Y is a is a $C_{1-6}$ hydrocarbyl group, in the 4 position of each phenyl ring and the two other $R^3$ groups are tert-butyl groups; and/or
(C) at least one $R^4$ is an —OY group, wherein Y is a is a $C_{1-6}$ hydrocarbyl group in the 4-position of the phenyl ring and the two other $R^4$ groups are tert-butyl groups;
$R^5$ is a linear or branched $C_{1-6}$-alkyl group; and
$R^6$ is a —$C(R^8)_3$ group, with $R^8$ being a linear or branched $C_1$ or $C_2$ alkyl group.

5. The metallocene complex as claimed in claim 1, wherein the metallocene complex is of formula (III)

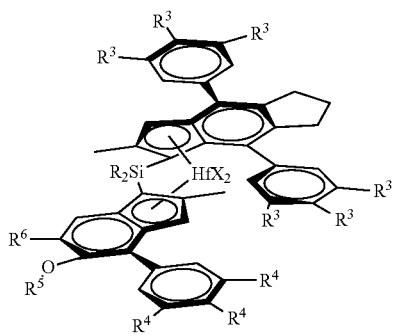

(III)

wherein
each X is the same and is a sigma-ligand selected from chloro chloride, benzyl and $C_{1-6}$alkyl;
$R_2Si—$ is $Me_2Si$ or $Et_2Si—$;
each non-hydrogen $R^3$ is the same and each non-hydrogen $R^4$ is the same;
$R^3$ is hydrogen, a linear or branched $C_{1-6}$-alkyl group;
$R^4$ is hydrogen, a linear or branched $C_{1-6}$-alkyl group;

wherein at least one $R^3$ per phenyl group and at least one $R^4$ is not hydrogen, and wherein at least one $R^3$ per phenyl group and at least one $R^4$ is hydrogen,
$R^5$ is a linear or branched $C_{1-4}$-alkyl group; and
$R^6$ is a —$C(R^8)_3$ group, with $R^8$ being a linear or branched $C_1$ or $C_2$ alkyl group.

6. The metallocene complex as claimed in claim 1, wherein the metallocene complex is of formula (IVa) to (IVd)

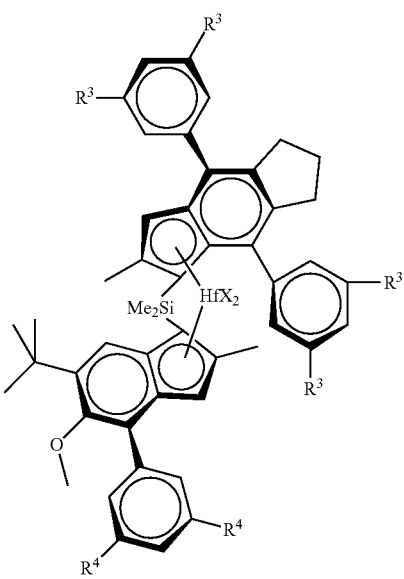

Formula (IVa)

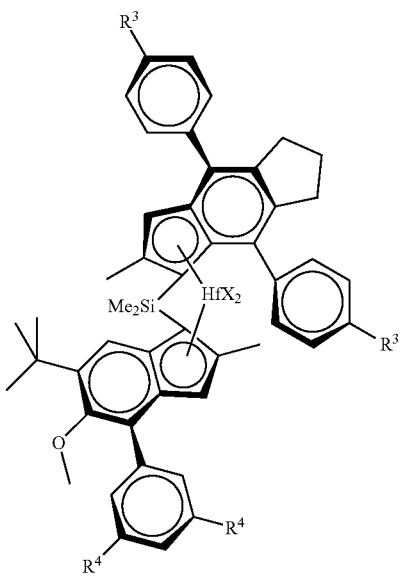

Formula (IVb)

-continued

Formula (IVc)

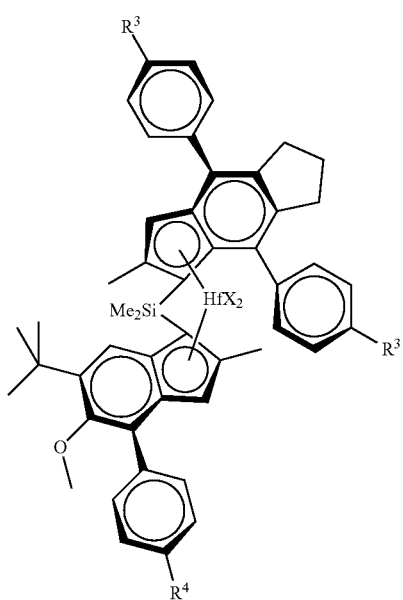

Formula (IVd)

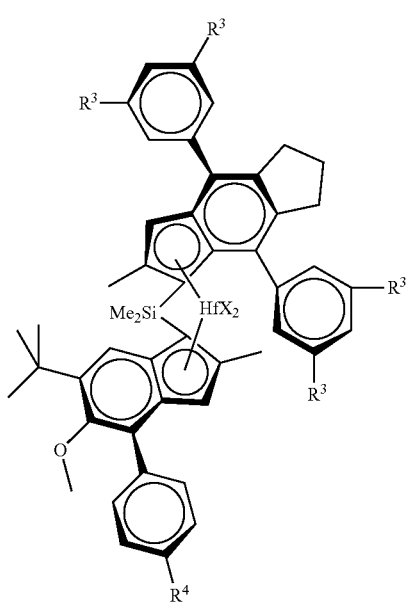

wherein
each X is the same and is chloride, benzyl, or $C_{1-6}$-alkyl;
each $R^3$ and $R^4$ independently is a linear or branched $C_{1-6}$-alkyl group.

7. The metallocene complex according to claim 1, wherein the complex is:
rac-anti-dimethylsilanediyl [2-methyl-4,8-bis-(3',5'-dimethylphenyl)-1,5,6,7-tetrahydro-s-indacen-1-yl] [2-methyl-4-(3',5'-dimethylphenyl)-5-methoxy-6-tert-butylinden-1-yl] Hafnium dichloride (MC-1);
rac-anti-dimethylsilanediyl [2-methyl-4,8-bis-(4'-tert-butylphenyl)-1,5,6,7-tetrahydro-s-indacen-1-yl][2-methyl-4-(3',5'-dimethyl-phenyl)-5-methoxy-6-tert-butylinden-1-yl] Hafnium dichloride (MC-2);
rac-anti-dimethylsilanediyl [2-methyl-4,8-bis-(4'-tert-butylphenyl)-1,5,6,7-tetrahydro-s-indacen-1-yl][2-methyl-4-(4'-tert-butylphenyl)-5-methoxy-6-tert-butyl-inden-1-yl] Hafnium dichloride (MC-3);
rac-anti-dimethylsilanediyl [2-methyl-4,8-bis-(3',5'-dimethylphenyl)-1,5,6,7-tetrahydro-s-indacen-1-yl][2-methyl-4-(3',5'-di-tert-butyl-phenyl)-5-methoxy-6-tert-butylinden-1-yl] Hafnium dichloride (MC-4); or
rac-anti-dimethylsilanediyl [2-methyl-4,8-bis-(3',5'-dimethylphenyl)-1,5,6,7-tetrahydro-s-indacen-1-yl] [2-methyl-4-(4'-tert-butylphenyl)-5-methoxy-6-tert-butylinden-1-yl] Hafnium dichloride (MC-5).

8. A catalyst system comprising:
(i) the metallocene complex according to claim 1; and
(ii) a cocatalyst comprising a compound of a group 13 element.

9. The catalyst system according to claim 8, wherein cocatalyst (ii) comprises alumoxane, combinations of alumoxane with Al-alkyls, boron or borate cocatalysts, or combinations of alumoxanes with boron-based cocatalysts.

10. The catalyst system as claimed in claim 8, wherein the catalyst system is in solid form, being supported on an external carrier.

11. The catalyst system as claimed in claim 10, wherein the catalyst system is supported on silica.

12. A process for the polymerization of propylene comprising reacting propylene and optional comonomers with the catalyst system as claimed in claim 8.

13. The process as claimed in claim 12, wherein the process is for the preparation of a heterophasic propylene ethylene or heterophasic propylene ethylene 1-butene copolymer, the process comprising:
(I) polymerising propylene and optionally ethylene and/or 1-butene in the presence of the catalyst system so as to form:
a1) a crystalline fraction (CF) comprising a propylene homopolymer or propylene copolymer matrix having up to 2 wt % comonomer as said matrix component; and
(II) subsequently polymerising additional propylene and ethylene and optionally 1-butene in the presence of the matrix component of step (I) so as to form:
a2) a propylene ethylene or propylene ethylene 1-butene copolymer soluble fraction (SF) having a comonomer content of 12 to 85 wt %;
wherein the crystalline fraction (CF) constitutes 30.0 to 95.0 wt % and the soluble fraction (SF) constitutes 5.0 to 70.0 wt % of the heterophasic propylene ethylene or heterophasic propylene ethylene 1-butene copolymer, wherein the amount of crystalline fraction (CF) and the amount soluble fraction (SF) are determined in 1,2,4-trichlorobenzene at 40° C.; and
wherein the soluble fraction (SF) of the heterophasic propylene ethylene or propylene ethylene 1-butene copolymer has an intrinsic viscosity IV(SF) in decalin at 135° C. of 1.5 to 10 dl/g.

* * * * *